(12) United States Patent
Nakasendo et al.

(10) Patent No.: US 9,496,985 B2
(45) Date of Patent: Nov. 15, 2016

(54) DECODING SYSTEM AND DECODING METHOD

(71) Applicant: Panasonic Corporation, Osaka (JP)

(72) Inventors: Tsuyoshi Nakasendo, Hyogo (JP); Yasumori Hino, Nara (JP); Kohei Nakata, Nara (JP); Yuji Takagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

(21) Appl. No.: 14/130,794

(22) PCT Filed: May 29, 2013

(86) PCT No.: PCT/JP2013/003390
§ 371 (c)(1),
(2) Date: Jan. 3, 2014

(87) PCT Pub. No.: WO2013/179662
PCT Pub. Date: Dec. 5, 2013

(65) Prior Publication Data
US 2014/0126657 A1    May 8, 2014

(30) Foreign Application Priority Data
May 31, 2012   (JP) ................................ 2012-125240

(51) Int. Cl.
*H04B 7/216*   (2006.01)
*E21C 25/10*   (2006.01)
(Continued)

(52) U.S. Cl.
CPC ....... *H04L 1/0061* (2013.01); *G11B 20/10277* (2013.01); *G11B 20/10287* (2013.01);
(Continued)

(58) Field of Classification Search
CPC .................. G11B 20/10481; G11B 20/10398; G11B 20/10222; G11B 20/1816; G11B 20/10037; G11B 20/182; G11B 20/10305

USPC .......................................... 370/342; 299/104
See application file for complete search history.

(56) References Cited

U.S. PATENT DOCUMENTS

| | | | | |
|---|---|---|---|---|
| 5,471,738 A * | 12/1995 | Burcham | .............. | B23P 11/025 29/701 |
| 6,097,714 A * | 8/2000 | Nagatani | ................ | H04B 1/707 370/342 |
| 8,238,318 B1 * | 8/2012 | Negus | ................... | H04W 84/12 370/310 |

(Continued)

FOREIGN PATENT DOCUMENTS

JP   2005-141887   6/2005
JP   2007-512741   5/2007

(Continued)

OTHER PUBLICATIONS

Eiji Yamada et al., "Turbo Decoding with Run Length Limited Code for Optical Storage", Japanese Journal of Applied Physics, Mar. 2002, vol. 41 (2002), pp. 1753-1756, Part 1, No. 3B.

(Continued)

*Primary Examiner* — Daniel Washburn
*Assistant Examiner* — Sarah Hassan
(74) *Attorney, Agent, or Firm* — Wenderoth, Lind & Ponack, L.L.P.

(57) ABSTRACT

A decoding system includes: a modulator which modulates user data by using a modulation rule which converts the user data into a modulation pattern; a regenerator which generates a regenerative signal from a signal obtained by transmitting the user data after modulation through a transmission path; a transmission path decoder which generates signals as generation signals corresponding to the modulation pattern, and calculates k (k is a positive integer) distances between the regenerative signal and the k generation signals in an interval having a length fixedly or dynamically determined; and a demodulator which calculates reliability information for each bit of the user data, and estimates each bit of the user data based on the calculated reliability information. The demodulator calculates likelihood that each bit of the user data is 1 and each bit of the user data is 0 by Formula (A), and calculates the reliability information by Formula (B).

14 Claims, 11 Drawing Sheets

(51) Int. Cl.
*H04L 1/00* (2006.01)
*H04B 1/707* (2011.01)
*G11B 20/10* (2006.01)
*G11B 20/14* (2006.01)
*G11B 20/18* (2006.01)

(52) U.S. Cl.
CPC ....... *G11B20/1426* (2013.01); *G11B 20/1833* (2013.01); *H04B 1/707* (2013.01); *H04L 1/0054* (2013.01); *G11B 2020/185* (2013.01)

(56) References Cited

U.S. PATENT DOCUMENTS

| | | | | |
|---|---|---|---|---|
| 2003/0067904 | A1* | 4/2003 | Nagatani | H04B 1/707 370/342 |
| 2006/0033379 | A1* | 2/2006 | Frear | E21C 35/197 299/107 |
| 2006/0115029 | A1* | 6/2006 | Marrow | 375/348 |
| 2007/0113163 | A1 | 5/2007 | Golitschek Edler Von Elbwart et al. | |
| 2007/0171800 | A1 | 7/2007 | Okamoto et al. | |
| 2007/0189334 | A1* | 8/2007 | Awad | H04L 27/2621 370/491 |
| 2008/0030065 | A1* | 2/2008 | Frear | E21C 35/197 299/104 |
| 2010/0050048 | A1* | 2/2010 | Djordjevic et al. | 714/755 |

FOREIGN PATENT DOCUMENTS

| | | |
|---|---|---|
| JP | 2007-272973 | 10/2007 |
| JP | 2007-305285 | 11/2007 |
| JP | 2009-26386 | 2/2009 |

OTHER PUBLICATIONS

International Search Report issued Jul. 2, 2013 in International (PCT) Application No. PCT/JP2013/003390.

* cited by examiner

FIG. 2

| MODULATION PATTERN | USER DATA |
|---|---|
| S0=0000000000000010 | D0=00000000 |
| S1=0000000000000100 | D1=00000001 |
| S2=0000000000001000 | D2=00000010 |
| S3=0000000000001010 | D3=00000011 |
| S4=0000000000010000 | D4=00000100 |
| S5=0000000000010010 | D5=00000101 |
| S6=0000000000010100 | D6=00000110 |
| S7=0000000000100000 | D7=00000111 |
| S8=0000000000100010 | D8=00001000 |
| S9=0000000000100100 | D9=00001001 |
| S10=0000000000101000 | D10=00001010 |
| S11=0000000000101010 | D11=00001011 |
| ... | ... |

DECODING SYSTEM AND DECODING METHOD

TECHNICAL FIELD

The present invention relates to a decoding system and a decoding method for decoding signals acquired from a transmission path.

BACKGROUND ART

Lately a turbo code or a low density parity check code (LDPC code) are used not only in a communication or broadcasting field, but also in a field of recording-regenerating media of digital data, such as magnetic disks or optical disks. It is known that the turbo code or the LDPC code has an error correction capability close to a theoretical limitation, and a recording-regenerating apparatus that handles reliability information as a soft decision value has been proposed (e.g. see Patent Document 1).

FIG. 11 is a diagram depicting a configuration of a conventional recording-regenerating apparatus that handles a soft decision value. In FIG. 11, the recording-regenerating apparatus 101 includes an encoder 102, a PR (Partial Response) transmission path 103, and a decoder 104.

The encoder 102 includes an error correction encoder 111 and a modulation encoder 112. The error correction encoder 111 generates an error correction code sequence by attaching a parity sequence to an input data sequence based on a predetermined rule. The modulation encoder 112 encodes the input error correction code sequence into a predetermined modulation code based on a predetermined modulation rule, and outputs the modulation code, to which a predetermined restriction is added, to the PR transmission path 103 as an encoded sequence.

For example, a DC free restriction which equalizes a number of codes "0" and a number of codes "1" in a sufficiently long range, a (d, k) restriction which makes a minimum length and a maximum length of a number of "0s" that continue to d and k respectively, or the like is used as the predetermined restriction.

The PR transmission path 103 includes a recording-regenerating portion 113 and an equalization processor 114. The PR transmission path 103 performs recording process or regenerating process in a recording-regenerating channel of PR2 (Partial Response class-2).

The recording-regenerating portion 113 performs NRZI (Non-Return to Zero Inverted) encoding on the encoded sequence input from the modulation encoder 112, and records the NRZI-encoded signal on the installed recording medium or internal recording medium using a mark edge recording method. The recording-regenerating portion 113 also reads out the encoded signal recorded on a recording medium via the PR2 channel, and supplies the read out and encoded signal to the equalization processor 114.

The equalization processor 114 performs PR equalization processing using waveform interference on the encoded signal supplied from the recording-regenerating portion 113, so as to have predetermined target equalization characteristics, and supplies the encoded signal, to which the PR equalization processing has been performed, to the decoder 104.

The decoder 104 includes a PR-SISO decoder 115, an SISO demodulator 116 and an error correction decoder 117. The PR-SISO decoder 115 performs predetermined decode processing on the encoded signal supplied from the equalization processor 114, and outputs a soft decision value.

Here, SISO is an acronym for Soft-Input Soft-Output, and refers to the processing to input-output the soft decision value.

The PR-SISO decoder 115 determines trellis representation, where a state transition table that indicates the encoding process of each time is developed in a time series based on the NRZI encoded data and the PR2 channel, from the encoded signal received from the PR transmission path 103. The PR-SISO decoder 115 computes probability based on the determined trellis representation in the NRZI encoded data and the PR2 channel so as to calculate the reliability information as the soft decision value.

The SISO demodulator 116 calculates reliability information modulated and decoded using a trellis based on the modulation rule of the modulation encoder 112.

The reliability information calculation using the trellis by the PR-SISO decoder 115 and the SISO demodulator 116 is executed according to a BCJR (Bahl-Cocke-Jeinek-Raviv) algorithm, for example.

The error correction decoder 117 uses turbo decoding, for example. The error correction decoder 117 performs error correction by performing turbo decoding corresponding to the turbo code used by the error correction encoder 111. Patent Document 1 also discloses an example of performing error correction decoding using the LDPC code.

Patent Document 2 discloses a Sum-Product decoding method that implements decoding by the LDPC code (hereafter called "LDPC decoding").

Non-patent Document 1 presents an example of soft decision decoding using a trellis based on a PR transmission path and a modulation rule in signal processing for optical disks.

Further, Viterbi decoding, used in signal processing of regenerative signal for optical disks and the like as PR decoding, is known.

When executing LDPC decoding, reliability information as a soft decision value is calculated by modeling, in general, signals modulated by binary phase reversal amplitude shift keying (PR-ASK), binary phase shift keying (BPSK), or the like, using an additive white Gaussian noise (AWGN) transmission path. In this specification, in order to simplify description, the AWGN transmission path in the BPSK modulation, which is most easily handled, is defined as a model of a general transmission path of the LDPC decoding. The PR-ASK modulation may be regarded as the equivalent to the BPSK modulation.

When applying the LDPC decoding to an actual transmission path such as communication and recording-regenerating, distribution of the reliability information calculated by the channel decoding and demodulation processing may sometimes deviate compared to distribution of the reliability information calculated by the LDPC decoding in which modeling is performed with the general AWGN transmission path in the BPSK modulation. The cause of the deviation of distribution is an influence of the modulation rule, in which the information of an arbitrary element (bit) of original data is dispersed into plural elements (bits) in the data after conversion, or an influence of the transmission path, in which the information of an arbitrary element (bit) of the original data is dispersed into plural components of the regenerative signal. In particular, the deviation of distribution, in which the reliability information corresponding to an error bit is distributed over a wide range, degrades the performance of the LDPC decoding when applied to an actual transmission path, compared with the performance of the LDPC decoding when modeled with the general AWGN transmission path in the BPSK modulation.

The deviation of distribution of the reliability information like this may be checked by simple simulation using a BCJR algorithm based on PR (12221) as the equalization system, for example. In this simulation, the deviation of the distribution of the reliability information in particular notably appears as a spread of the distribution of a portion corresponding to an error bit.

By the dispersion of the information in the modulation or the transmission path, the distance in the original data and the distance in the modulated data or in the signal on the transmission path become different values. As a result, an error generated by noise on the transmission path may influence the decoding of the original data as major errors.

When the reliability information of a bit is calculated from the modulated data or a signal on the transmission path, where information of the bit of the original data has been dispersed, the dispersion of information of the bit is not considered in the case of conventional PR decoding using a BCJR algorithm, disclosed in Patent Document 1, for example. Therefore the dispersed information is not efficiently reflected on the reliability information of the bit. As a result, it is difficult to demonstrate the original decoding performance in conventional PR decoding, such as the LDPC decoding, which utilizes this reliability information of the bit.

Patent Document 1: Japanese Patent Application Laid-Open No. 2005-141887

Patent Document 2: Japanese Patent Application Laid-Open No. 2007-272973

Non-patent Document 1: Eiji Yamada, Tetsuo Iwaki and Takeshi Yamaguchi, "Turbo Decoding with Run Length Limited Code for Optical Storage", Japanese journal of applied physics, March 2002, Vol. 41 (2002), pp. 1753-1756, Part 1, No. 3B

SUMMARY OF INVENTION

With the foregoing in view, it is an object of the present invention to provide a decoding system and a decoding method that may decrease the influence of dispersion of information of a bit on reliability information by improving the calculation of the reliability information.

A decoding system according to an aspect of the present invention includes: a modulator which modulates user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern; a regenerator which generates a regenerative signal from a signal obtained by transmitting the user data after modulation by the modulator through the transmission path; a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and a demodulator which calculates reliability information for each bit of the user data based on the distances between the regenerative signal and the generation signals in the interval, and estimates each bit of the user data based on the calculated reliability information, wherein the transmission path has characteristics to disperse an arbitrary element of a signal transmitted through the transmission path into plural components of the regenerative signal, the transmission path decoder generates k (k is a positive integer) generation signals, and respectively calculates k distances between the regenerative signal and each of the k generation signals in the interval, and the demodulator uses the k distances calculated by the transmission path decoder to respectively calculate likelihood that each bit of the user data is 1 and likelihood that each bit of the user data is 0 by Formula (A), and calculates the reliability information by Formula (B):

[Mathematical Expression 1]

$$p_j(x) = \sum_{i=0:d_{ij}=x}^{k-1} p(m_i) = \sum_{i=0:d_{ij}=x}^{k-1} \left[ \frac{1}{\sqrt{2\pi\sigma^2}} \exp\left\{-\frac{m_i^2}{2\sigma^2}\right\} \right] \quad (A)$$

[Mathematical Expression 2]

$$\lambda_j = \{p_j(0) - p_j(1)\} \cdot Q \quad (B)$$

Here, x is 0 or 1, $p_j(x)$ is likelihood that j-th bit of the user data is x, $d_{ij}$ is the j-th bit of the user data corresponding to the modulation pattern of i-th generation signal out of the k generation signals, $m_i$ is a distance between the i-th generation signal out of the k generation signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined.

According to the present invention, the transmission path decoder calculates k distances between the regenerative signal and each of the generation signals in the interval respectively. Hence elements of the signal transmitted through the transmission path, dispersed into plural components of the regenerative signal, may be accumulated. The demodulator calculates the likelihood of the bit of the user data before modulation by Formula (A) from the distances between the regenerative signal and the generation signals in the interval. Therefore, information on the bit of the user data, dispersed into plural bits of the modulation pattern by the modulation rule, may be accumulated. As a result, influence of the dispersion of information on the reliability information, due to modulation or transmission, may be decreased. Further, the reliability information is calculated by Formula (B). Hence the state where the numeric values of the reliability information infinitely diverge is not generated. As a result, the reliability information may be appropriately calculated.

BRIEF DESCRIPTION OF DRAWINGS

FIG. 2 is an example of a demodulation table according to Embodiment 1 of the present invention.

DESCRIPTION OF EMBODIMENTS

Embodiments of the present invention will now be described with reference to the drawings. Even if an embodiment disclosed in this description is not written here as an embodiment of the present invention, this does not mean that this embodiment does not correspond to the present invention. Conversely, even if an embodiment is written here as an embodiment of the present invention, this does not mean that this embodiment does not correspond to an invention other than the present invention.

Embodiment 1

Figure 1:
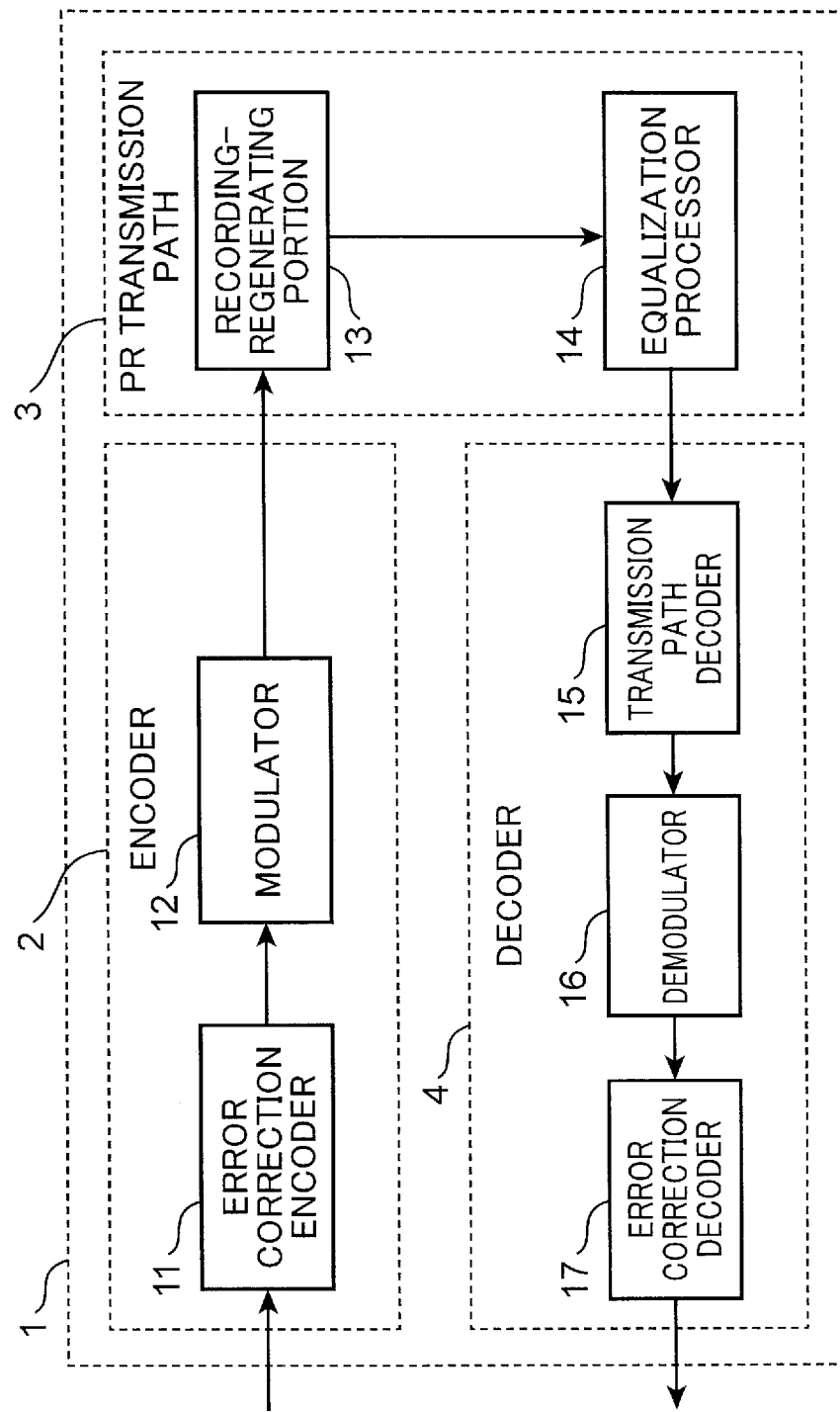
FIG. 1 is a diagram depicting a configuration of a decoding system according to Embodiment 1 of the present invention.

FIG. 1 is a diagram depicting a configuration of a decoding system according to Embodiment 1 of the present invention. The decoding system 1 shown in FIG. 1 includes an encoder 2, a PR (Partial Response) transmission path 3, and a decoder 4. The decoding system 1 performs error correction encoding on input data using a predetermined error correction encoding method, and decodes an encoded signal acquired by an encoded sequence, which is generated by modulation encoding using a predetermined modulation rule, passing through the PR transmission path 3.

The encoder 2 includes an error correction encoder 11 and a modulator 12. The error correction encoder 11 performs error correction encoding on the input data using the predetermined error correction encoding method. The error correction encoder 11 outputs an encoded sequence generated by performing the error correction encoding. The error correction encoder 11 generates an error correction code sequence (user data) by attaching a parity sequence to the input data sequence based on a predetermined rule. The error correction encoder 11 performs encoding based on an LDPC code, for example.

The modulator 12 holds a predetermined modulation rule. Using the modulation rule that is held, the modulator 12 performs modulation encoding on the encoded sequence generated by performing the error correction encoding. The modulator 12 encodes the input error correction code sequence (user data) into predetermined modulation codes based on the predetermined modulation rule that is held. The modulator 12 outputs the modulation codes to the PR transmission path 3 as an encoded sequence which has been restricted considering characteristics of the PR transmission path 3.

The predetermined restriction includes, for example, a DC free restriction which equalizes a number of codes "0" and a number of codes "1" in a sufficiently long range, (d, k) restriction which restricts the minimum length and the maximum length of a number of continuing "0s" to d and k respectively, and restriction of a number of times of repeat of a predetermined pattern, such as a number of continuous occurrences of an interval where a code of "0" and "1" continues.

The modulation rule disperses information on an arbitrary bit of the user data into plural bits of the modulation pattern by converting the user data having a predetermined bit length (8 bits in Embodiment 1, as described later) into a modulation pattern having a bit length equivalent to or different from the predetermined bit length (16 bits in Embodiment 1, as described later) depending on the characteristics of the PR transmission path 3. The bit length of the modulation pattern in the modulation rule in Embodiment 1 is 16-bit of one kind. Alternatively, the bit length of the modulation pattern in the modulation rule may be plural kinds.

In Embodiment 1, the modulation rule is predetermined such that the distance between plural modulation patterns after conversion becomes shorter as the distance between plural pieces of the user data is shorter. Here the distance between the plural pieces of the user data and the distance between the modulation patterns are, for example, Hamming distances respectively. The distance between the modulation patterns may be a Euclidean distance.

The PR transmission path 3 includes a recording-regenerating portion 13 and an equalization processor 14. The PR transmission path 3 has characteristics to limit a band of a signal to be transmitted. As a result, the PR transmission path 3 has characteristics to disperse an arbitrary element of a signal transmitted through the PR transmission path 3 into plural components of a regenerative signal (described later). The PR transmission path 3 performs recording process or regenerating process in the recording-regenerating channel of PR2 according to the band limiting characteristics of the PR transmission path 3, for example.

The recording-regenerating portion 13 records the encoded sequence, generated by performing the modulation encoding, on an information recording medium such as an optical disk. The recording-regenerating portion 13 performs NRZI encoding on the encoded sequence input from the modulator 12 for example. The recording-regenerating portion 13 records the encoded signal, on which the NRZI encoding has been performed, on an installed information recording medium or an internal information recording medium using a mark edge recording method.

The recording-regenerating portion 13 regenerates the encoded signal recorded on the information recording medium to generate a regenerative signal. The recording-regenerating portion 13 reads out the encoded signal recorded on the recording medium using the PR2 channel, and supplies the read out and encoded signal to the equalization processor 14. The type of the partial response (PR equalization system) of the recording-regenerating portion 13 is, for example, PR121, PR1221, PR12221 or PR122221. The recording-regenerating portion 13 may use a PR equalization system other than the above PR equalization systems.

In Embodiment 1, the recording-regenerating portion 13 is configured to perform both the recording process and the regenerating process. However, the recording-regenerating portion 13 may be divided into a recorder that performs recording process and a regenerator that performs regenerating process. This aspect is also the same for other embodiments that are described later. The recording-regenerating portion 13 corresponds to an example of the recorder. Further, the recording-regenerating portion 13 corresponds to an example of the regenerator.

The equalization processor 14 performs predetermined equalization processing on the regenerative signal generated by the recording-regenerating portion 13. The equalization processor 14 performs PR equalization processing using waveform interference on the regenerative signal so that predetermined target equalization characteristics is implemented. The regenerative signal is generated by regenerating the encoded signal and is supplied from the recording-regenerating portion 13. The equalization processor 14 supplies the processed regenerative signal to the decoder 4.

The decoder 4 includes a transmission path decoder 15, a demodulator 16 and an error correction decoder 17. The transmission path decoder 15 generates a reference signal (corresponding to an example of the generation signal) corresponding to the modulation pattern in an interval by Viterbi decoding, from the encoded signal on which the equalization processing has been performed by the equalization processor 14. The interval is determined depending on the bit length of the modulation pattern. The Viterbi decoding is based on a trellis considering the characteristic of the PR transmission path 3. The transmission path decoder 15 calculates a metric, which is a distance between the regenerative signal, on which the equalization processing has been performed by the equalization processor 14, and the reference signal. The above interval will be described later.

In Embodiment 1, plural combinations of selected k (k is a positive integer) modulation patterns and k metrics, including a combination of the decoded modulation pattern and the distance (metric), are input to the demodulator 16 from the transmission path decoder 15 for each interval. The decoded modulation pattern will be described later. Hereafter, the selected k modulation patterns are also called "modulation patterns of decoding candidates". The demodulator 16 uses the metrics input from the transmission path decoder 15 to calculate the reliability information for each bit. The demodulator 16 holds a demodulation table in advance based on the modulation rule used by the modulator 12. The demodulator 16 uses the calculated reliability information to estimate the user data for each bit.

Figure 3:
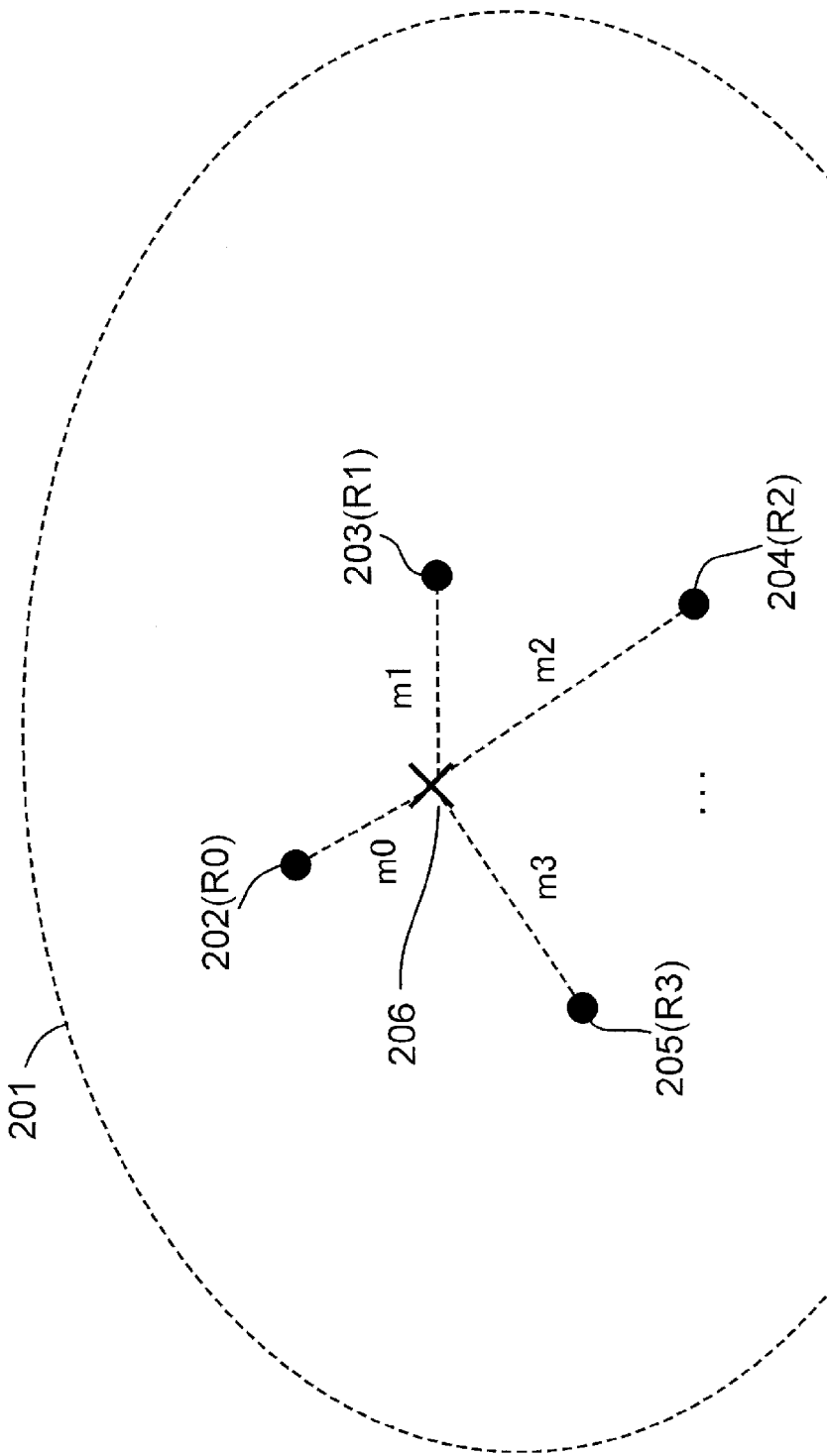
FIG. 3 is a diagram depicting a signal space on a PR transmission path according to Embodiment 1 of the present invention.
Figure 4:
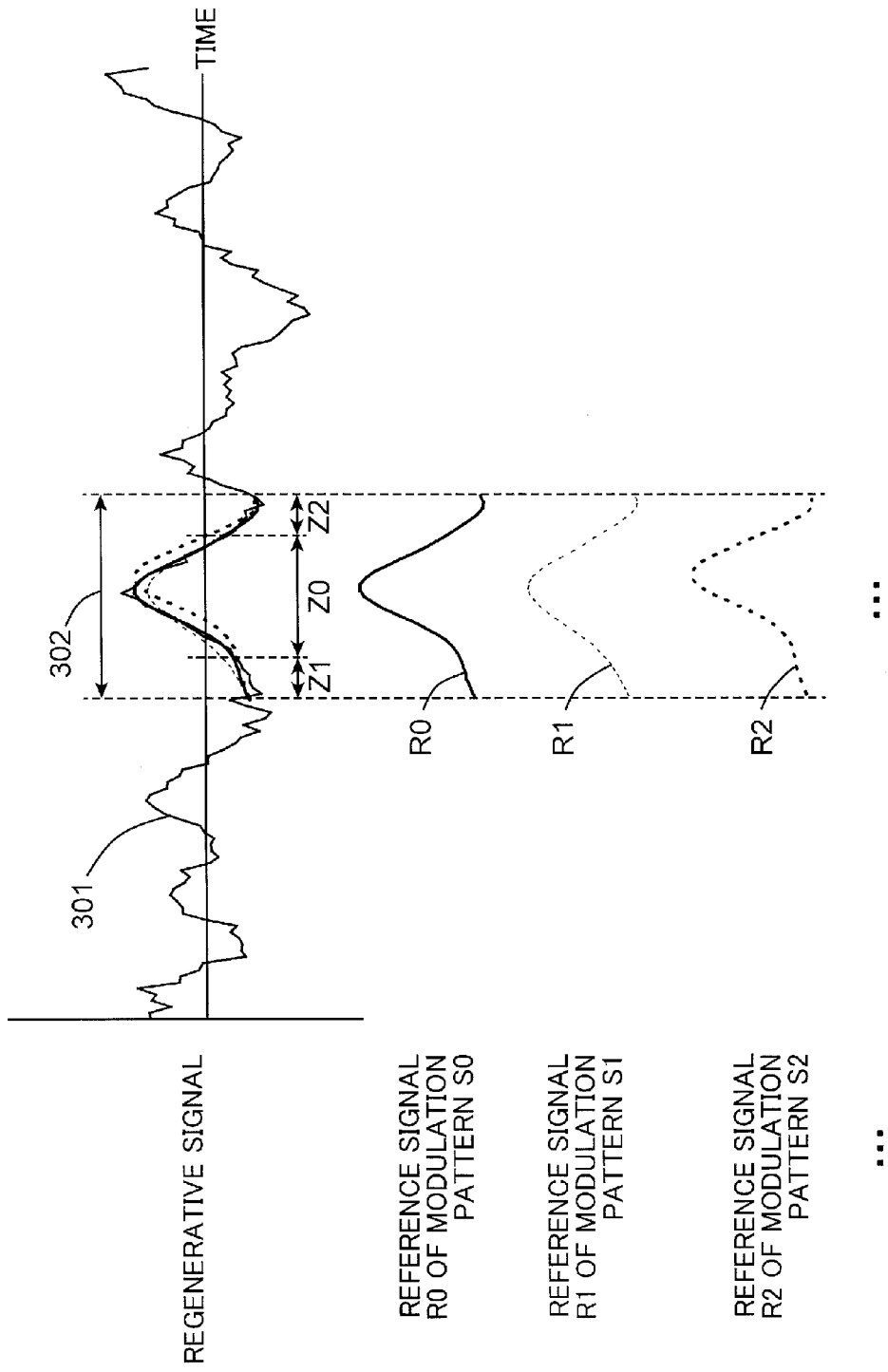
FIG. 4 is a diagram depicting a relationship between a regenerative signal and reference signals according to Embodiment 1 of the present invention.

FIG. 2 shows an example of a demodulation table 200 held by the demodulator 16. FIG. 3 is a diagram depicting a signal space on the PR transmission path 3. FIG. 4 is a diagram depicting a relationship between a regenerative signal and reference signals. Functions of the transmission path decoder 15 and the demodulator 16 will be further described with reference to FIG. 2 to FIG. 4.

The demodulation table 200 shown in FIG. 2 is an example of the demodulation table based on the modulation rule which converts 8-bit user data into 16-bit modulation patterns. In FIG. 2, only a part of N (N=256) modulation patterns for 8-bit user data (modulation rule) is shown. FIG. 2 is an example of the modulation rule where the bit length of data after conversion is fixed to 8 bits without depending on the modulation pattern. The present embodiment, however, is not limited to this example, and the modulator 12 may hold a modulation rule where the bit length changes depending on the modulation pattern, for example.

In FIG. 3, a signal space 201 is a signal space on the PR transmission path 3 of a modulation pattern, which is converted by the modulation rule used by the modulator 12. A signal point 202 is a signal point on the PR transmission path 3 of the modulation pattern S0 in the demodulation table 200 in FIG. 2, for example. The signal point 202 represents a reference signal R0. The reference signal (corresponding to an example of the generation signal) is an analog signal generated by the transmission path decoder 15 from the modulation pattern, which is digital data, considering the band limiting characteristics of the PR transmission path 3. The transmission path decoder 15 generates N (N=256) reference signals corresponding to N modulation patterns, for example.

Signal points 203, 204 and 205 are respectively signal points on the PR transmission path 3 for modulation patterns S1, S2, and S3 in the demodulation table 200 in FIG. 2, for example. Signal points 203, 204 and 205 represent the reference signals R1, R2 and R3. In this way, FIG. 3 shows a part of the reference signals which correspond to the modulation patterns one-to-one.

The signal space 201 is, for example, a Euclidean space. However the present embodiment is not limited to this, and the signal space 201 may be a binary multi-dimensional space, that is, a modulation pattern itself in which each signal point is 0 or 1.

The signal point 204 represents a regenerative signal 301 (FIG. 4) in the interval 302 (FIG. 4), for example, acquired on the PR transmission path 3. A metric m0 is a distance indicated by the dotted line connecting the reference signal R0 represented by the signal point 202 and the regenerative signal 301 represented by the signal point 206. In the same manner, the metrics m1, m2 and m3 indicate the distances between the reference signals R1, R2 and R3 and the regenerative signal 301 (FIG. 4) respectively.

In the present embodiment, the distance of the modulation pattern on the PR transmission path 3 calculated by the transmission path decoder 15, such as the metric m0 in FIG. 3, is a Euclidean distance, for example. Instead of the Euclidean distance, the distance calculated by the transmission path decoder 15 may be a difference of the absolute values of the coordinate vector from the signal point 202 to the signal point 206, for example, or may be defined by other expressions.

The transmission path decoder 15 compares distances between each of the generated 256 reference signals (reference signals R0, R1, R2 in FIG. 4) and the regenerative signal 301 generated by the recording-regenerating portion 13, for each interval (e.g. interval 302 in FIG. 4). The transmission path decoder 15 selects, for each interval, a modulation pattern corresponding to the most probable reference signal (maximum likelihood signal) with respect to the regenerative signal 301 obtained by Viterbi decoding as the decoded modulation pattern. In this case, the most probable reference signal is the reference signal of which a distance from the regenerative signal 301 is the shortest. The transmission path decoder 15 outputs the modulation pattern selected as the decoded modulation pattern and the distance (metric) to the demodulator 16.

The transmission path decoder 15 of the present embodiment not only outputs the decoded modulation pattern, but also outputs the modulation patterns corresponding to other reference signals of which distances from the regenerative signal 301 are shorter, and distances (metrics) thereof, to the demodulator 16 for each interval (e.g. interval 302 in FIG. 4). The transmission path decoder 15 extracts k (k=16 in Embodiment 1, for example) modulation patterns including the decoded modulation pattern (the modulation pattern corresponding to the reference signal of which a distance from the regenerative signal 301 is the shortest) in order of a shorter distance (metric) from the regenerative signal 301.

The transmission path decoder 15 outputs the extracted k modulation patterns and the distances (metrics) thereof to the demodulator 16.

Alternatively, the transmission path decoder 15 may output modulation patterns corresponding to all the reference signals of which distances from the regenerative signal 301 are not more than a predetermined threshold value, and metrics thereof, to the demodulator 16.

Further alternatively, the transmission path decoder 15 may output modulation patterns corresponding to k reference signals out of the reference signals of which distances from the regenerative signal 301 are not more than a predetermined threshold value, and metrics thereof, to the demodulator 16. In this case, the transmission path decoder 15 need not select modulation patterns in order of a shorter distance from the regenerative signal 301. For example, the transmission path decoder 15 need not select a modulation pattern corresponding to the reference signal, of which a distance from the regenerative signal 301 is the second shortest. Even in this case, each of the distances between the reference signals corresponding to the modulation patterns selected and output to the demodulator 16 and the regenerative signal 301 is a relatively short distance, which is not more than the predetermined threshold value.

In Embodiment 1, the temporal length and the temporal position of the interval (e.g. interval 302 in FIG. 4), where the transmission path decoder 15 compares the distances between the regenerative signal 301 and the reference signals, are fixedly determined depending on the bit length of the modulation pattern (16 bits in FIG. 2). The temporal length and the temporal position of the above interval may be dynamically determined or determined based on a predetermined rule.

FIG. 4 indicates a case where the interval of the signal on the PR transmission path 3 of the modulation pattern based on the modulation rule used by the modulator 12 and the interval of a reference signal of which a distance from the regenerative signal 301 is calculated by the transmission path decoder 15 are the same, which is the interval 302.

In Embodiment 1, as illustrated in FIG. 4, the length of the interval, where the transmission path decoder 15 calculates the distance between the regenerative signal and the reference signal, matches with the length of the interval of the signal on the PR transmission path 3 of the modulation pattern based on the modulation rule used by the modulator 12, but may not match in some cases in general. In a case where the lengths of the both intervals do not match, the transmission path decoder 15 may determine the temporal length and the temporal position of the intervals based on a predetermined rule, for example. This case will be described later in Embodiment 5.

In the case of a modulation rule where the modulation pattern is defined as plural bit lengths, the interval, in which the decoded modulation pattern (that is, the reference signal of which a distance from the regenerative signal is the shortest) is selected, may have plural lengths depending on to each bit length. In this case, the transmission path decoder 15 may dynamically determine the temporal length and the temporal position of the interval depending on each bit length. This case will be described later in Embodiment 4 and Embodiment 5.

In FIG. 4, for the interval 302 decoded by Viterbi decoding out of the regenerative signal 301, the transmission path decoder 15 selects k (k is a positive integer) modulation patterns corresponding to the reference signals of which distances from the regenerative signal 301 are short in the interval 302. In a case where the transmission path decoder 15 selects modulation patterns corresponding to three reference signals R0, R1 and R2, for example, k is equal to 3.

The transmission path decoder 15 calculates metrics which are distances between the generated reference signals R0, R1 and R2 and the regenerative signal 301 respectively. In other words, in Embodiment 1, the transmission path decoder 15 calculates k (1 or more) combinations of the modulation patterns corresponding to the reference signals and the distances (metrics). The transmission path decoder 15 outputs the calculated k combinations of the modulation patterns and the distances (metrics) to the demodulator 16. The transmission path decoder 15 may use a combined trellis, which is a combination of a trellis based on the characteristics of the PR transmission path 3 and a trellis based on the modulation rule held by the modulator 12.

The demodulator 16 calculates the reliability information for each bit. Hereinafter, a method of calculating the reliability information for each bit in the interval 302 will be described using the demodulation table 200 shown in FIG. 2, and the relationship between the reference signals and the regenerative signal shown in FIG. 3.

From the transmission path decoder 15, k modulation patterns Si (i=0, . . . , k−1) and k metrics $m_i$ (i=0, . . . , k−1) corresponding to the modulation patterns respectively are input to the demodulator 16. In the example of the demodulation table 200 shown in FIG. 2, the value k may be 256, which is a number of combinations of all the modulation patterns, may be a predetermined number smaller than 256, or may be a variable number unique to the decoded modulation patterns.

The metric $m_i$ that represents the distance between signal points on the PR transmission path 3 (e.g. the distance between the signal point 202 that represents the reference signal and the signal point 206 that represents the regenerative signal in FIG. 3) may be a sum of squares of the difference between amplitude of the reference signal and amplitude of the regenerative signal at each unit time in the interval 302, for example. Alternatively, the metric $m_i$ may be a sum of the difference between amplitude of the reference signal and amplitude of the regenerative signal at each unit time in the interval 302, for example. Alternatively, the metric $m_i$ may be a sum of the absolute values of the difference between amplitude of the reference signal and amplitude of the regenerative signal at each unit time in the interval 302, for example. Further alternatively, the transmission path decoder 15 may calculate the metric $m_i$ by calculation that signifies some kind of distance. The amplitude of the reference signal or the regenerative signal may be quantized and degenerated.

The demodulator 16 defines the probability (likelihood) $p_j(x)$ that j-th bit of the user data is x as the following Formula (1).

[Mathematical Expression 3]

$$p_j(x) = \sum_{i=0:d_{ij}=x}^{k-1} p(m_i) = \sum_{i=0:d_{ij}=x}^{k-1} \left[ \frac{1}{\sqrt{2\pi\sigma^2}} \exp\left\{-\frac{m_i^2}{2\sigma^2}\right\} \right] \quad (1)$$

Here, x is 0 or 1, $d_{ij}$ denotes the j-th bit of the user data corresponding to the i-th modulation pattern Si in the demodulation table 200, j is an integer in a 1 to M range, and M is a bit length of the user data. The middle part of Formula (1) expresses a sum of the probabilities of the modulation patterns where the j-th bit of the user data to be demodulated is x, out of k probabilities calculated from k modulation patterns and k metrics selected in an interval input to the demodulator 16.

The demodulator 16 calculates the probability using Formula (1), based on, for example, a model called addictive white Gaussian noise, where it is assumed that white Gaussian noise with standard deviation σ is applied, as the system noise, to the reference signal at each time.

From Formula (1), the demodulator 16 calculates the reliability information $\lambda_j$ of the j-th bit of the user data as the logarithmic likelihood ratio using Formula (2).

[Mathematical Expression 4]

$$\lambda_j = \ln \frac{p_j(0)}{p_j(1)} \quad (2)$$

In Formula (2), the reliability information is a logarithmic ratio of the decoding probability of a minimum unit of a symbol or information. The minimum unit of information is, for example, a binary code, that is, a bit indicating "0" or "1", or a multi-value element.

In Embodiment 1, the transmission path decoder 15 selects k metrics to be output to the demodulator 16 out of N (N=256) distances (metrics) in order from the smallest metric (shortest distance), for example. Hence, the probability (likelihood) of Formula (1) is determined by the selected metrics. In this case, there are (N−k) modulation patterns corresponding to the unselected metrics, but the distances (metrics) between the reference signals corresponding to these modulation patterns and the regenerative signal take large values. Therefore, the unselected modulation patterns do not greatly affect the accuracy of the reliability information calculated by Formula (2).

The demodulation table 200 held by the demodulator 16 is determined by the predetermined modulation rule used by the modulator 12. As described above, the modulation rule used by the modulator 12 is predetermined such that the distance between the modulation patterns after conversion is shorter as the distance between plural pieces of the user data is shorter, in Embodiment 1 for example. Hence, in a case where errors tend to occur easily to modulation patterns (that is, a case where the distance between the modulation patterns is short because the modulation patterns are similar), the difference between plural pieces of the user data is small even if errors occur to the user data. Therefore, an error that occurs in PR decoding does not affect significantly as an error in the user data.

The modulation rule used by the modulator 12 may be predetermined so as to have a Gray code arrangement, in which the Hamming distance between plural pieces of the user data before conversion is 1, for example. In this instance, in a case where an error easily occurs to the modulation patterns (that is, a case where the distance between the modulation patterns is short because the modulation patterns are similar), even if an error occurs to the user data, it will be in most cases a 1-bit error because of the Gray code arrangement. As a result, an error in the modulation patterns does not affect significantly as an error in the user data.

Referring back to FIG. 1, the error correction decoder 17 performs error correction on the user data estimated by the demodulator 16 based on the error correction code rule used by the error correction encoder 11. The error correction decoder 17 performs error correction based on the LDPC decoding, for example. The LDPC decoding is performed by a Sum-Product decoding method, for example. After an error is corrected by the error correction decoder 17, the user data is acquired when error correction succeeds.

Figure 5:
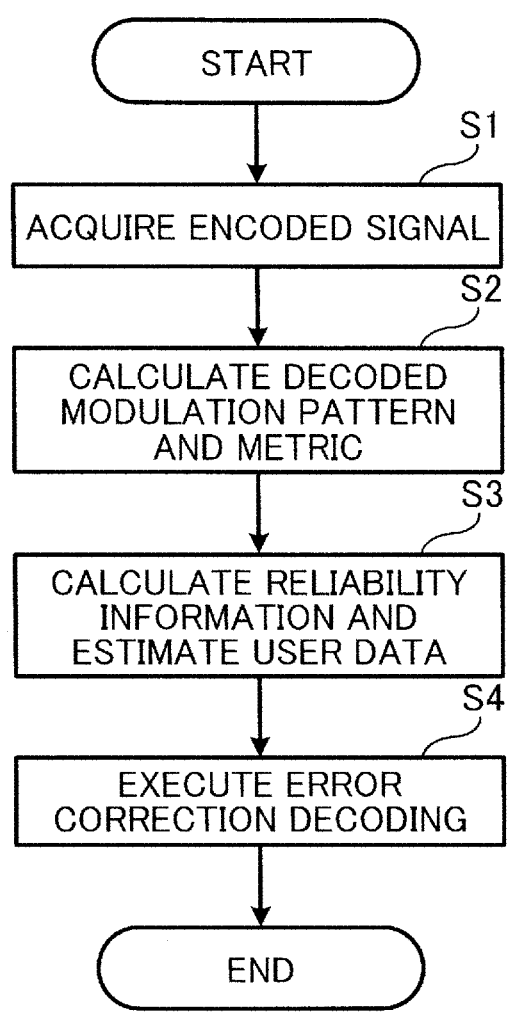
FIG. 5 is a flow chart depicting a decoding operation of the decoding system according to Embodiment 1 of the present invention.

FIG. 5 is a flow chart depicting the decoding operation of the decoding system 1 according to Embodiment 1 of the present invention.

First, in step S1, the transmission path decoder 15 acquires the encoded signal on which the equalization processing has been performed by the equalization processor 14 of the PR transmission path 3.

In step S2, the transmission path decoder 15 calculates the k modulation patterns decoded by Viterbi decoding and the metric of each modulation pattern as described above, from the encoded signal on which the equalization processing has been performed by the equalization processor 14.

In step S3, using the demodulation table 200 based on the modulation rule, the demodulator 16 calculates the reliability information for each bit from the decoded k modulation patterns and k metrics, as described above. The demodulator 16 also estimates the user data based on the calculated reliability information for each bit.

In step S4, the error correction decoder 17 performs the LDPC decoding by the Sum-Product decoding method for example, using the user data estimated by the demodulator 16 as input.

As described above, in Embodiment 1, the transmission path decoder 15 performs the maximum likelihood decoding, for each interval, in which a modulation pattern is calculated, the modulation pattern corresponding to the reference signal of which a distance from the regenerative signal 301 is the shortest among the distances between the regenerative signal 301 and each of the reference signals. Therefore, according to Embodiment 1, elements dispersed into plural components of the regenerative signal 301 on the PR transmission path 3 may be accumulated. The demodulator 16 calculates the reliability information of the user data before modulation for each bit from the distances between the regenerative signal 301 and the reference signals R0, R1, R2 and the like, calculated for each interval, using Formula (1) and Formula (2). Thereby the information of an arbitrary bit of the user data dispersed into plural bits of the modulation patterns by the modulation rule may be accumulated. As a result, influence of the dispersion of information of the bit on the reliability information may be decreased. Hence, the demodulator 16 may appropriately estimate the user data for each bit based on the calculated reliability information.

Therefore, according to Embodiment 1, deterioration of the decoding result by the influence of dispersion of information due to modulation or transmission on the reliability information may be prevented. Hence, degradation in performance of error correction decoding based on the LDPC codes by the error correction decoder 17 may be prevented.

In Embodiment 1, the transmission path decoder 15 selects only k distances out of the calculated N distances, and outputs the selected k distances to the demodulator 16, and the demodulator 16 calculates the reliability information using the k distances. Therefore, according to Embodiment 1, the time required for calculating the reliability information may be decreased compared with the case of calculating the reliability information using N distances. The reliability information is also calculated using the k distances which are extracted in order of shorter distance. Hence, according to Embodiment 1, there is an advantage that the accuracy of the calculation of the reliability information does not decrease significantly, compared with a case of calculating the reliability information using all of the N distances.

In Embodiment 1, the encoder 2, the PR transmission path 3 and the decoder 4 are included in the same decoding system 1, but the encoder 2 and the decoder 4 may be independent apparatuses respectively. In this case, the encoder 2 and the decoder 4 may have a part of or all of the functions of the PR transmission path 3 respectively. The decoding system 1 according to Embodiment 1 may be a stand-alone apparatus, or may be a block that performs decode processing of the recording-regenerating apparatus, or a block that performs decode processing of the optical communication system.

Embodiment 2

A decoding system according to Embodiment 2 of the present invention will be described. The configuration of the decoding system according to Embodiment 2 is the same as the configuration of the decoding system 1 according to Embodiment 1 depicted in FIG. 1. Therefore, the decoding system according to Embodiment 2 will be described with reference to FIG. 1. In Embodiment 2, detailed description of the decoding system 1 is omitted, and a different embodiment of calculating the reliability information by the demodulator 16 will be described.

In the calculation of the reliability information according to Embodiment 2, the demodulator 16 performs the operation until calculation of Formula (1) in the same manner as Embodiment 1. Here, the difference after calculation of Formula (1) will be described.

The demodulator 16 calculates the reliability information $\lambda_j$ of the j-th bit of the user data corresponding to the decoded modulation pattern by Formula (3) using the result of Formula (1).

[Mathematical Expression 5]

$$\lambda_j = \{p_j(0) - p_j(1)\} \cdot Q \quad (3)$$

Here, the coefficient Q is a real number. The coefficient Q may be a predetermined fixed value. The coefficient Q may be a value determined by a modulation pattern to be decoded, k modulation patterns of decoding candidates, the user data to be demodulated, or the like. The coefficient Q may also be a value dynamically determined by a state of the PR transmission path 3, a value of the metric, decoding result by the error correction decoder 17, or the like.

In Formula (3), the reliability information is a difference of the decoding probability of a minimum unit of a symbol or information. As described above, the minimum unit of information is, for example, a binary code, that is, a bit indicating "0" or "1", or a multi-value element.

In Formula (3) as well, the probability (likelihood) that the j-th bit of the user data is 0 is higher as the reliability information $\lambda_j$ of the j-th bit of the user data is a greater positive value, and the probability (likelihood) that the j-th bit of the user data is 1 is higher as the reliability information $\lambda_j$ of the j-th bit of the user data is a greater negative value.

In Embodiment 2, just like above Embodiment 1, the transmission path decoder 15 selects k metrics to be output to the demodulator 16 out of N (N=256) distances (metrics) in order from the smallest metric (shortest distance), for example. Hence, the probability (likelihood) of Formula (1) is determined by the selected metrics. In this case, there are (N−k) modulation patterns corresponding to the unselected metrics, but the distances (metrics) between the reference signals corresponding to the (N−k) modulation patterns and the regenerative signal take large values. Therefore, the accuracy of the reliability information calculated by Formula (3) is not greatly decreased by the unselected modulation patterns.

As described above, Embodiment 2 is the same as above Embodiment 1, except that Formula (3) is used instead of Formula (2). Therefore, according to Embodiment 2, deterioration of the decoding result by the influence of dispersion of information due to modulation or transmission may be prevented, just like above Embodiment 1. Hence, a decrease in performance of error correction decoding based on the LDPC codes by the error correction decoder 17 may be prevented.

In Embodiment 2, just like above Embodiment 1, the time required for calculating the reliability information may be decreased, compared with the case of calculating the reliability information using N distances. Furthermore, according to Embodiment 2, just like above Embodiment 1, there is an advantage that the accuracy of calculation of the reliability information does not greatly decrease compared with the case of calculating the reliability information using all of the N distances.

In Embodiment 2, the modulation rule need not be defined such that the distance between the plural modulation patterns after conversion becomes shorter as the distance between the plural user data is shorter. In other words, the modulation rule requires only that the information of an arbitrary bit of user data is dispersed into plural bits of the modulation pattern by converting the user data having a predetermined bit length into the modulation pattern having a bit length that is the same as or different from the predetermined bit length depending on the characteristic of the PR transmission path 3. In Formula (3), a state where the value of the reliability information $\lambda_j$ infinitely diverges does not occur. Therefore, according to Embodiment 2, the reliability information may be appropriately calculated, even if such a modulation rule is used. As a result, the user data may be decoded appropriately. Further, according to Embodiment 2, the reliability information may be easily calculated only by the subtraction and multiplication of Formula (3).

Embodiment 3

A decoding system according to Embodiment 3 of the present invention will now be described. The decoding system according to Embodiment 3 records an encoded signal on an information recording medium, regenerates the encoded signal from the information recording medium, and decodes the regenerated and encoded signal.

The configuration of the decoding system according to Embodiment 3 is the same as the configuration of the decoding system 1 according to Embodiment 1 shown in FIG. 1. Therefore the decoding system according to Embodiment 3 will be described with reference to FIG. 1. In Embodiment 3, detailed description of the decoding system 1 is omitted, and only the recording operation and regenerating operation of the decoding system 1 will be described.

Figure 6:
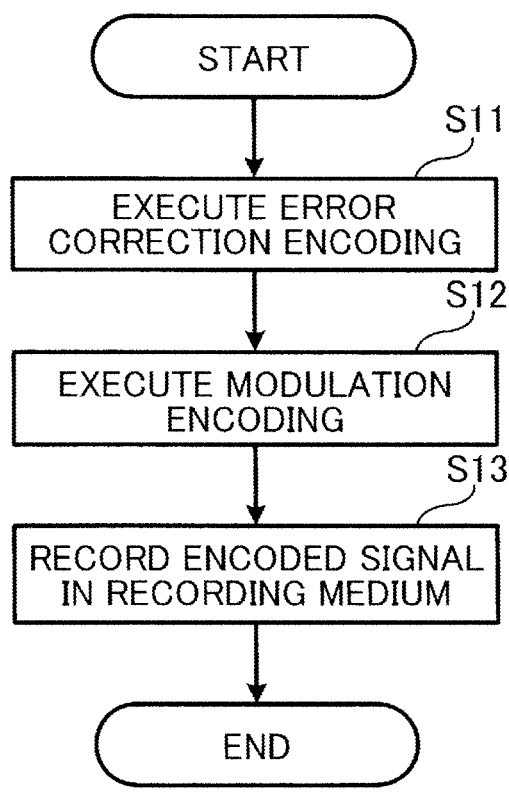
FIG. 6 is a flow chart depicting a recording operation of the decoding system according to Embodiment 3 of the present invention.

FIG. 6 is a flow chart depicting recording operation of the decoding system 1 according to Embodiment 3 of the present invention.

First, in step S11, the error correction encoder 11 performs error correction encoding on the input data using an LDPC encoding method, and outputs an encoded signal generated by the error correction encoding.

In step S12, the modulator 12 performs modulation encoding using 17 PP (Parity preserve/Prohibit repeated minimum transition run-length) codes on the encoded signal generated by the error correction encoder 11 performing the error correction encoding.

In step S13, the recording-regenerating portion 13 records the encoded signal generated by the modulator 12 performing the modulation encoding, on an information recording medium. The recording-regenerating portion 13 performs NRZI encoding on the encoded signal input from the modulator 12, and records the encoded signal generated by the NRZI encoding, on the information recording medium. The information recording medium is an optical disk, for example.

Figure 7:
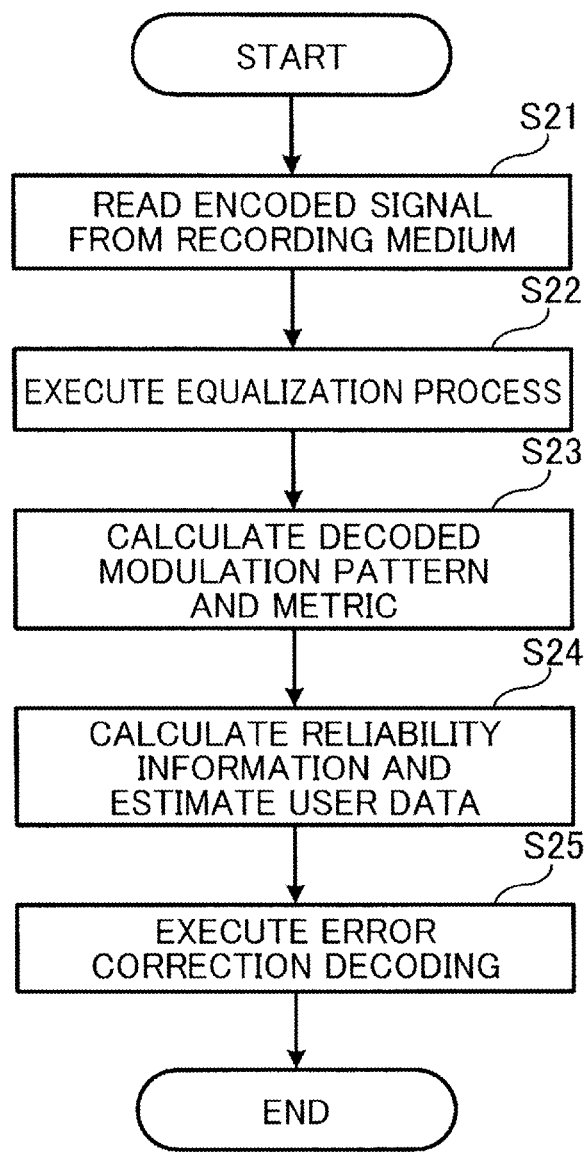
FIG. 7 is a flow chart depicting a regenerating operation of the decoding system according to Embodiment 3 of the present invention.

FIG. 7 is a flow chart depicting regenerating operation of the decoding system 1 according to Embodiment 3 of the present invention.

First, in step S21, the recording-regenerating portion 13 reads out via the PR2 channel an encoded signal recorded on an information recording medium, and supplies the read out and encoded signal to the equalization processor 14.

In step S22, the equalization processor 14 performs the PR equalization processing utilizing waveform interference on the encoded signal supplied from the recording-regenerating portion 13, so as to have predetermined target equalization characteristics.

In step S23, the transmission path decoder 15 calculates k modulation patterns, which have been decoded by Viterbi decoding, and each metric thereof, using the encoded signal supplied from the equalization processor 14.

In step S24, the demodulator 16 calculates the reliability information for each bit, using the demodulation table 200 based on the modulation rule, and the decoded modulation patterns and the metrics supplied from the transmission path decoder 15. The demodulator 16 also estimates the user data for each bit using the calculated reliability information.

In step S25, the error correction decoder 17 performs the error correction decoding on the user data estimated by the demodulator 16, based on the LDPC codes.

As described above, according to Embodiment 3, information may be appropriately recorded on the information recording medium, and information recorded on the information recording medium may be appropriately decoded.

Embodiment 4

A decoding system according to Embodiment 4 of the present invention will be described. The decoding system according to Embodiment 4 of the present invention is the same as the decoding system 1 according to Embodiment 1 depicted in FIG. 1. In Embodiment 4, operation of only the modulator 12 and the demodulator 16 will be described, since operation of the composing elements other than the modulator 12 and the demodulator 16 is the same as Embodiment 1, 2 or 3. Description of the configuration of Embodiment 4 other than the modulator 12 and the demodulator 16, which is the same as Embodiment 1, 2 or 3, is omitted.

The modulator 12 according to Embodiment 4 performs modulation of user data based on plural types of modulation rules, for example. In the plural modulation rules, there are one or more types of modulation patterns or bit lengths of the user data. The modulator 12 selects one modulation rule out of the plural modulation rules, at random or according to a predetermined rule. The modulator 12 modulates the user data according to the selected modulation rule.

The demodulator 16 holds plural demodulation tables based on plural modulation rules as the demodulation tables 200. Out of the demodulation tables 200 that are held, the demodulator 16 selects a demodulation table based on a modulation rule selected by the modulator 12. The demodulator 16 calculates the reliability information using the selected demodulation table 200.

Figure 8:
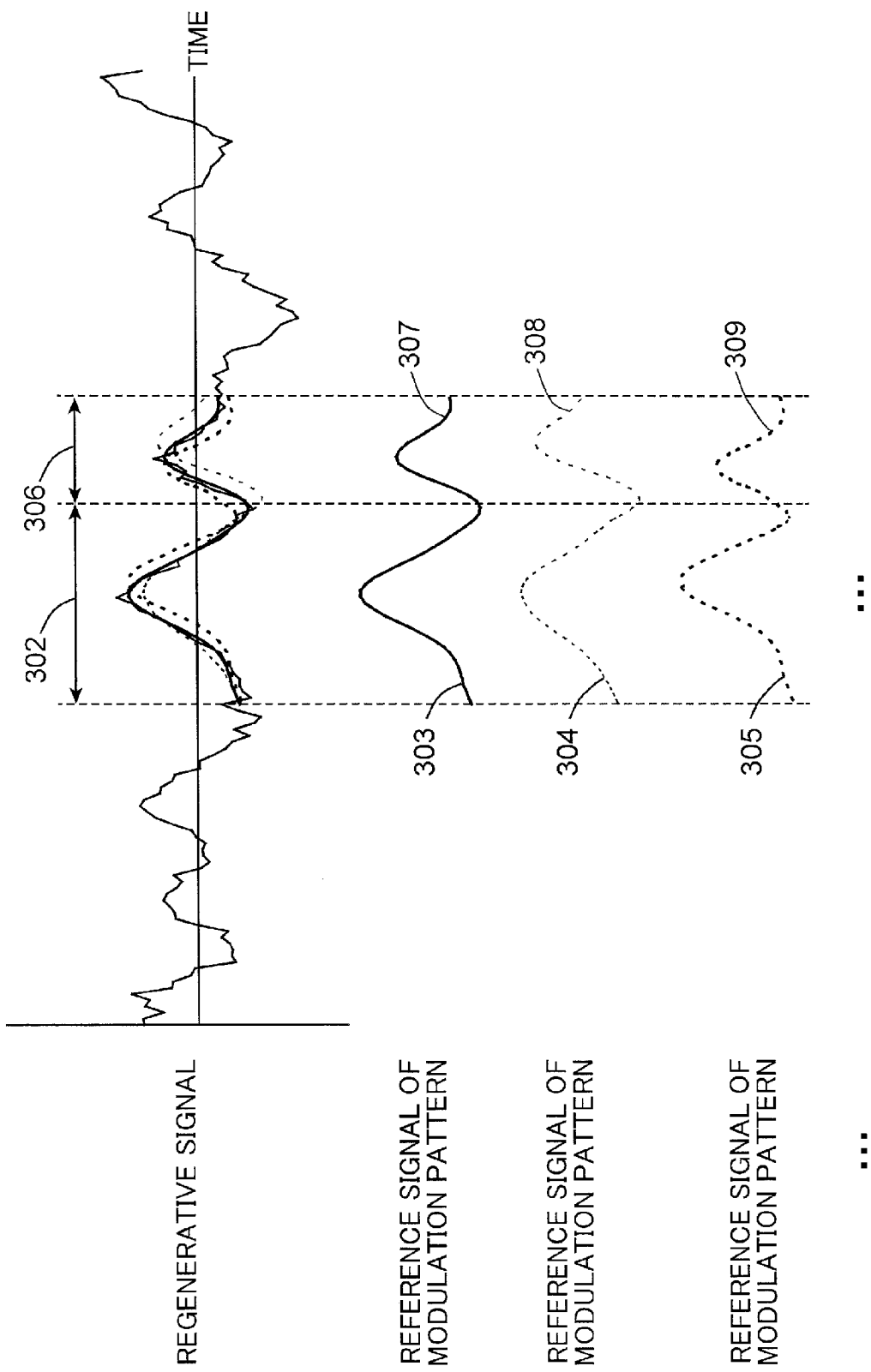
FIG. 8 is a diagram depicting a relationship between a regenerative signal and reference signals according to Embodiment 4 of the present invention.

FIG. 8 is a diagram depicting a relationship between a regenerative signal and reference signals according to Embodiment 4 when decoding is performed based on different modulation rules.

The length of the interval 302 and the length of the interval 306 are respectively determined depending on the bit length of the modulation pattern of the modulation rule selected by the modulator 12. Therefore, the length of the interval 302 and the length of the interval 306 may be different, as illustrated in FIG. 8. The interval 302 corresponds to a modulation rule which uses a 16-bit modulation pattern for example, and the interval 306 corresponds to a modulation rule which uses an 8-bit modulation pattern for example.

In Embodiment 4, the transmission path decoder 15 dynamically determines the length of the interval depending on the bit length of the modulation pattern of the modulation rule that is used by the modulator 12. In the interval 302, the transmission path decoder 15 generates reference signals of k modulation patterns to be output to the demodulator 16 based on the modulation rule corresponding to the interval 302, as reference signals 303, 304 and 305 for example. In the same manner, in the interval 306, the transmission path decoder 15 generates reference signals based on the modulation rule corresponding to the interval 306, as reference signals 307, 308 and 309 for example.

The demodulator 16 calculates the reliability information for each bit based on the demodulation table, which is different depending on the interval. The demodulator 16 calculates the reliability information by the method using Formulas (1) and (2) described in Embodiment 1, for example. Alternatively, the demodulator 16 may calculate the reliability information by the method using Formulas (1) and (3) described in Embodiment 2.

As described above, in Embodiment 4, the length of the interval is dynamically determined depending on the bit length of the modulation pattern of the modulation rule used by the modulator 12. Therefore, the distance (metric) between the regenerative signal and the reference signal may be calculated in an interval appropriately determined for the modulation rule (modulation pattern) which is used.

Embodiments 5

A decoding system according to Embodiment 5 of the present invention will be described. The configuration of the decoding system of Embodiment 5 is the same as the configuration of the decoding system 1 of Embodiment 1 depicted in FIG. 1. In Embodiment 5, operation of only the transmission path decoder 15 and the demodulator 16 will be described, since operation of the composing elements other than the transmission path decoder 15 and the demodulator 16 is the same as Embodiment 1, 2 or 3. Description of the configuration other than the transmission path decoder 15 and the demodulator 16, which is the same as Embodiment 1, 2 or 3, is omitted.

Figure 9:
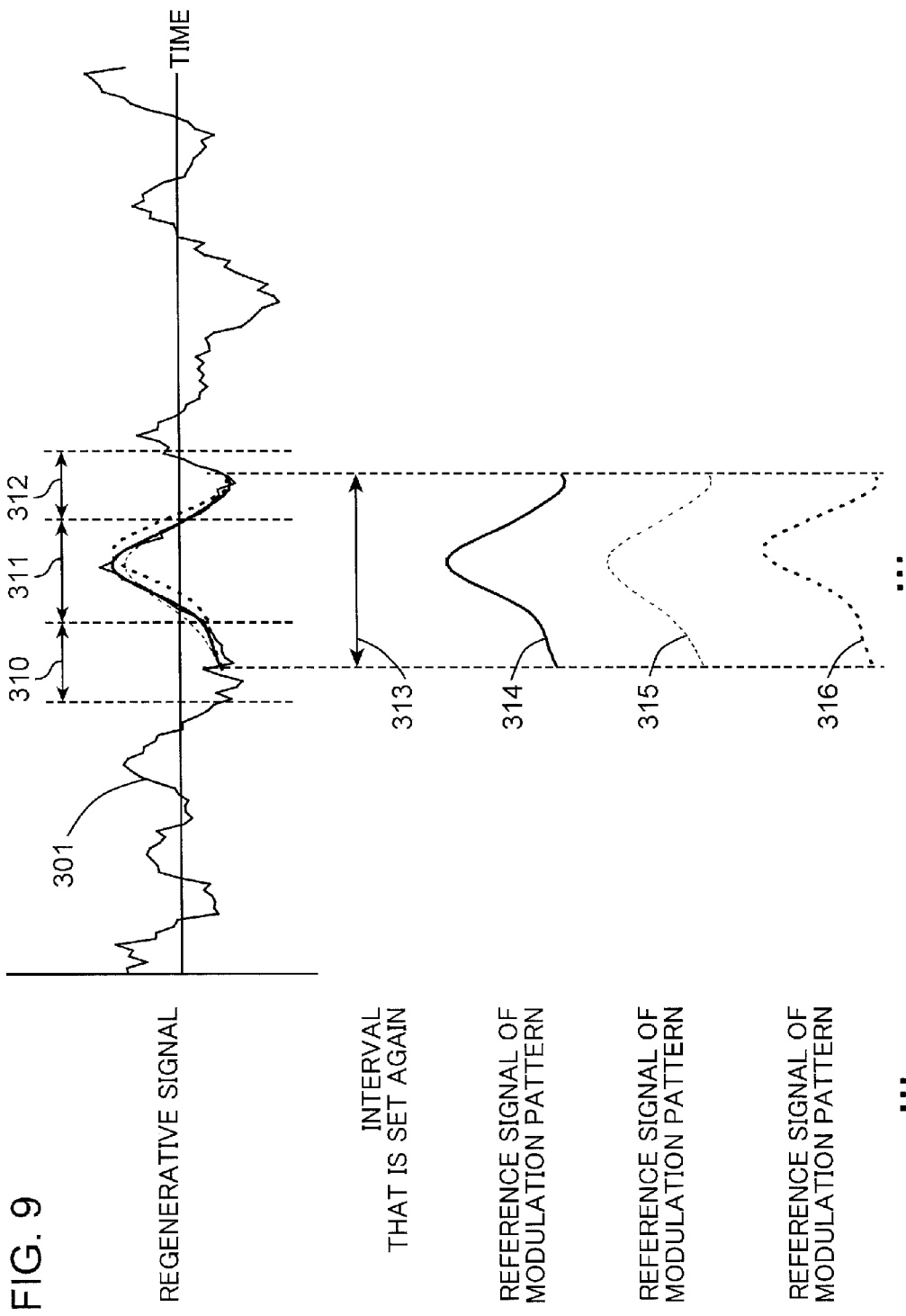
FIG. 9 is a diagram depicting a relationship between a regenerative signal and reference signals according to Embodiment 5 of the present invention.

FIG. 9 is a diagram depicting a relationship between a regenerative signal and reference signals in an interval that is reset, in Embodiment 5.

The transmission path decoder 15 according to Embodiment 5 calculates a distance (metric) between a regenerative signal in a predetermined interval or dynamically determined interval, and a reference signal on the PR transmission path 3 of the decoded modulation pattern in each interval.

In Embodiment 5, as illustrated in FIG. 9, it is not assumed that the intervals 310, 311 and 312 of the regenerative signal, which are decoding units when the transmission path decoder 15 performs decoding, match with the interval 313 for the demodulator 16 to process the reference signal for calculating the reliability information.

In Embodiment 5, after calculating a modulation pattern decoded by decode processing such as Viterbi decoding, the transmission path decoder 15 sets the interval 313 again so that the calculation interval of the metric matches with the interval 313 of the reference signal in the demodulator 16. In other words, when calculating the metric, the transmission path decoder 15 generates a reference signal 314 of the decoded modulation pattern using the interval 313, which has been set again, as a processing unit. The transmission path decoder 15 calculates the metric between the generated reference signal and the regenerative signal.

The transmission path decoder 15 may calculate metrics between the reference signals 315 and 316 of the modulation patterns which may become plural decoding candidates and the regenerative signal respectively. The transmission path decoder 15 supplies the one or more combination(s) of the modulation pattern and the metric to the demodulator 16.

The procedure to calculate the reliability information by the demodulator 16 hereafter is the same as Embodiment 1, for example. The demodulator 16 according to Embodiment 5 may calculate the reliability information by the same procedure as Embodiment 2.

Embodiment 6

A decoding system according to Embodiment 6 of the present invention will be described. The configuration of the decoding system of Embodiment 6 is the same as the configuration of the decoding system 1 of Embodiment 1 depicted in FIG. 1. In Embodiment 6, operation of only the transmission path decoder 15 and the demodulator 16 will be described, since operation of the composing elements, other than the transmission path decoder 15 and the demodulator 16, is the same as Embodiment 1, 2 or 3. Description of the configuration other than the transmission path decoder 15 and the demodulator 16, which is the same as Embodiment 1, 2 or 3, is omitted.

The transmission path decoder 15 according to Embodiment 6 selects plural modulation patterns of decoding candidates by a selection method that is different from Embodiment 1 or 2.

In the case of the transmission path decoder 15 performing the decode processing such as Viterbi decoding, the decoded modulation pattern, that is, a maximum likelihood modulation pattern, is defined as a modulation pattern Si. In the demodulation table 200 held by the demodulator 16, the user data corresponding to the modulation pattern Si is defined as a maximum likelihood user data Di.

In this case, the transmission path decoder 15 selects user data Di1 to Din which are different from the maximum likelihood user data Di by 1 bit. The number of the user data selected in this case, which is n, is equivalent to the bit length M of the maximum likelihood user data Di. In other words, if the user data Di has 8 bits (M=8), then n=8. The transmission path decoder 15 selects modulation patterns that correspond to the user data Di1 to Din respectively as the plural modulation patterns of decoding candidates in the demodulation table 200. The interval to be a unit of Viterbi decode processing by the transmission path decoder 15 is typically represented by the interval 302 in FIG. 4 just like Embodiment 1, for example.

Next, the transmission path decoder 15 calculates just n distances between the regenerative signal in each interval and each reference signal of the selected modulation patterns of decoding candidates (in concrete terms, modulation patterns corresponding to the user data Di1 to Din). The transmission path decoder 15 supplies the decoded modulation pattern Si, the selected n modulation patterns, and the calculated n distances to the demodulator 16.

The demodulator 16 determines the user data corresponding to the decoded modulation pattern. In the above case, it is the maximum likelihood user data Di. The demodulator 16 calculates the reliability information for each bit of the maximum likelihood user data Di. The demodulator 16 calculates the reliability information of each bit from the selected n modulation patterns (in concrete terms, modulation patterns corresponding to the user data Di1 to Din), which are different from the demodulated maximum likelihood user data Di by 1 bit, and the distances thereof.

For example, the demodulated maximum likelihood user data is defined as Di, and the modulation pattern corresponding to the user data Dj, which is different from the user data Di only in the first bit, is defined as Sj. In this case, the demodulator 16 calculates the reliability information of the first bit from the distance between the regenerative signal and the reference signal of the modulation pattern Sj.

Just like Embodiment 1 or 2, the demodulator 16 calculates the reliability information from the probability (likelihood) based on the assumption that white Gaussian noise, having a standard deviation $\sigma$, is applied as system noise at each timing of the reference signal, for example.

In Embodiment 6, as a modulation pattern to be compared when calculating the likelihood (reliability information) of a certain bit, the calculation is performed only from one modulation pattern and one distance. Therefore, the reliability information may be easily calculated. In Embodiment 6, the modulation rule is predetermined such that a combination of modulation patterns, which tend to generate errors, is assigned to user data of which difference is 1 bit. Therefore the decoding system of Embodiment 6 has sufficient accuracy in probability to perform the LDPC decoding.

Embodiment 7

A decoding system according to Embodiment 7 of the present invention will be described. The configuration of the decoding system of Embodiment 7 is the same as the configuration of the decoding system 1 of Embodiment 1 depicted in FIG. 1. In Embodiment 7, operation of only the transmission path decoder 15 and the demodulator 16 will be described, since operation of the composing elements other than the transmission path decoder 15 and the demodulator 16 is the same as Embodiment 1, 2 or 3. Description of the configuration other than the transmission path decoder 15 and the demodulator 16, which is the same as Embodiment 1, 2 or 3, is omitted.

The transmission path decoder 15 according to Embodiment 7 outputs a regenerative signal in an interval selected at each timing to the demodulator 16 in the decode processing of Viterbi decoding. The demodulator 16 calculates a distance between the regenerative signal in the input interval and the reference signal of the modulation pattern. Operation hereafter is the same as Embodiment 1 or 2.

Embodiment 8

An optical communication system according to Embodiment 8 of the present invention will be described.

Figure 10:
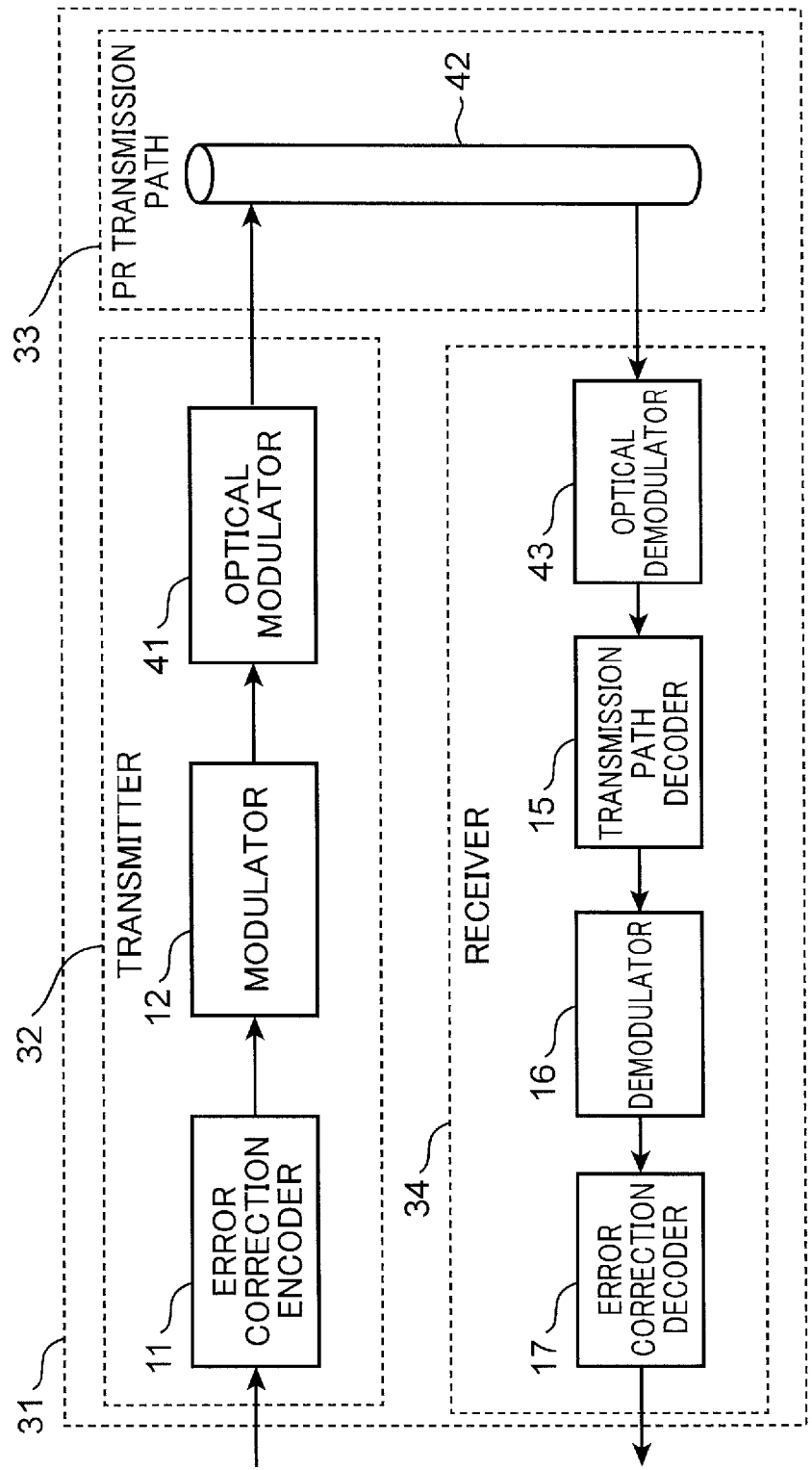
FIG. 10 is a diagram depicting a configuration of an optical communication system according to Embodiment 8 of the present invention.
Figure 11:
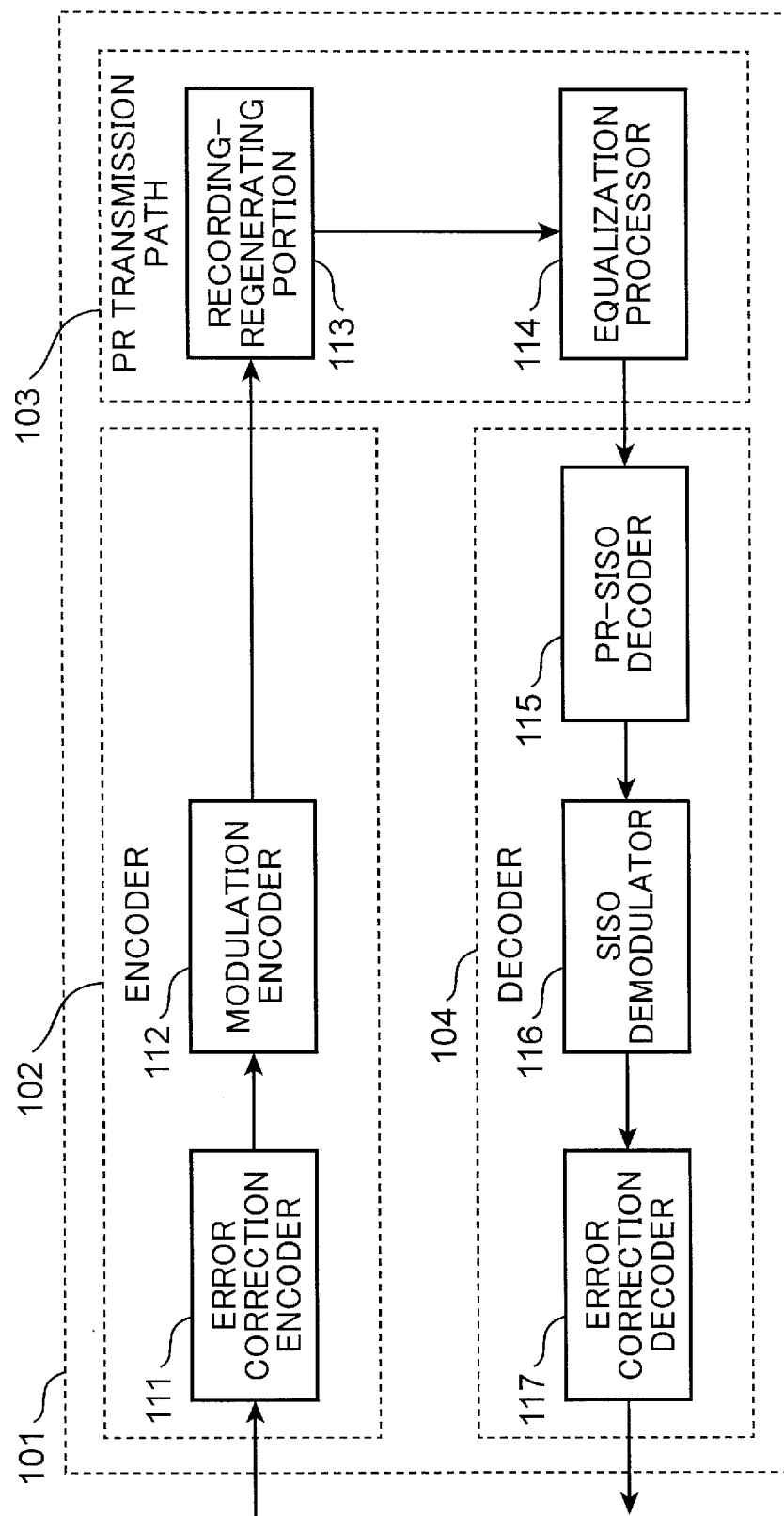
FIG. 11 is a diagram depicting a configuration of a conventional recording-regenerating apparatus.

FIG. 10 is a diagram depicting a configuration of the optical communication system according to Embodiment 8 of the present invention. The optical communication system 31 depicted in FIG. 10 includes a transmitter 32, a PR transmission path 33 and a receiver 34. The transmitter 32, which transmits transmission information, includes an error correction encoder 11, a modulator 12 and an optical modulator 41. The PR transmission path 33 includes an optical fiber 42. The receiver 34 includes a transmission path decoder 15, a demodulator 16, an error correction decoder 17 and an optical demodulator 43.

In Embodiment 8, only the configuration and operation of the optical modulator 41, the optical fiber 42 and the optical demodulator 43 are described, since the configuration other than the optical modulator 41, the optical fiber 42 and the optical demodulator 43 is the same as Embodiment 1, 2 or 3. The configuration of the composing elements other than the optical modulator 41, the optical fiber 42 and the optical demodulator 43, which is the same as Embodiment 1, 2 or 3, is omitted.

The optical modulator 41 generates an optical signal waveform in which the intensity or phase of light having a predetermined wavelength is modulated according to the encoded sequence generated by the modulator 12. The optical modulator 41 transmits the generated optical signal waveform to the optical fiber 42. The optical fiber 42 transfers the optical signal waveform transmitted from the transmitter 32 to the receiver 34. The optical demodulator 43 detects the intensity or phase of the light transferred by the optical fiber 42. The optical demodulator 43 converts the detected intensity or phase of the light into electric signals to decode the encoded sequence. The optical demodulator 43 outputs the decoded encoded sequence to the transmission path decoder 15.

(Other)

In each of the above embodiments, the transmission path decoder 15 calculates one or plural modulation pattern(s) and metric(s), but the demodulator 16 may perform this processing.

In each of the above embodiments, in the interval 302 illustrated in FIG. 4 for example, the transmission path decoder 15 determines the difference between the amplitude of the regenerative signal 301 and the amplitude of the reference signal R0 for each unit time for example, and calculates the distance (metric) throughout the interval 302. Alternatively, the transmission path decoder 15 may, as shown in FIG. 4, determine the difference between the amplitude of the regenerative signal 301 and the amplitude of the reference signal R0 for example, only in the central interval Z0 out of the interval 302 to calculate the distance (metric), the central interval Z0 being obtained by removing the predetermined lengths Z1 and Z2 from both ends of the interval which come before and after the central interval Z0 in time. According to this modified embodiment, the influence of the adjacent modulation patterns which come before and after the modulation pattern in time may be removed. As a result, even more appropriate reliability information may be calculated.

The embodiments described above mainly include the invention having the following configurations.

A decoding system according to an aspect of the present invention includes: a modulator which modulates user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern; a regenerator which generates a regenerative signal from a signal obtained by transmitting the user data after modulation by the modulator through the transmission path; a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and a demodulator which calculates reliability information for each bit of the user data based on the distances between the regenerative signal and the generation signals in the interval, and estimates each bit of the user data based on the calculated reliability information, wherein the transmission path has characteristics to disperse an arbitrary element of a signal transmitted through the transmission path into plural components of the regenerative signal, the transmission path decoder generates k (k is a positive integer) generation signals, and respectively calculates k distances between the regenerative signal and each of the k generation signals in the interval, and the demodulator uses the k distances calculated by the transmission path decoder to respectively calculate likelihood that each bit of the user data is 1 and likelihood that each bit of the user data is 0 by Formula (A), and calculates the reliability information by Formula (B):

[Mathematical Expression 6]

$$p_j(x) = \sum_{i=0:d_{ij}=x}^{k-1} p(m_i) = \sum_{i=0:d_{ij}=x}^{k-1} \left[\frac{1}{\sqrt{2\pi\sigma^2}}\exp\left\{-\frac{m_i^2}{2\sigma^2}\right\}\right] \quad (A)$$

[Mathematical Expression 7]

$$\lambda_j = \{p_j(0) - p_j(1)\} \cdot Q \quad (B)$$

Here x is 0 or 1, $p_j(x)$ is likelihood that j-th bit of the user data is x, $d_{ij}$ is the j-th bit of the user data corresponding to the modulation pattern of i-th generation signal out of the k generative signals, $m_i$ is a distance between the i-th generation signal out of the k generative signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined.

According to this configuration, the modulator modulates the user data using a modulation rule. The modulation rule converts the user data having a predetermined bit length into a modulation pattern having a bit length equivalent to or different from the predetermined bit length in accordance with characteristics of a transmission path, so as to disperse information on an arbitrary bit of the user data into plural bits of the modulation pattern. The regenerator generates a regenerative signal from a signal obtained by transmitting the user data after modulation by the modulator through the transmission path. The transmission path decoder generates signals by taking into account the characteristics of the transmission path with respect to the modulation pattern, as generation signals corresponding to the modulation pattern. The transmission path decoder calculates the distances between the regenerative signal and the generation signals in an interval having a length fixedly or dynamically determined depending on the bit length of the modulation pattern. The demodulator calculates reliability information for each bit of the user data based on the distances between the regenerative signal and the generation signals in the interval. The demodulator estimates each bit of the user data based on the calculated reliability information.

The transmission path has characteristics to disperse an arbitrary element of a signal transmitted through the transmission path into plural components of the regenerative signal. The transmission path decoder generates k generation signals, and calculates k distances between the regenerative signal and each of the generation signals in the interval respectively. Therefore, each element of the signal transmitted through the transmission path, which is dispersed into plural components of the regenerative signal, may be accumulated. The demodulator calculates likelihood of each bit of the user data before modulation by Formula (A) from the distances between the regenerative signal and the generation signals in the interval, using the k distances calculated by the transmission path decoder. Hence information on each bit of the user data, which is dispersed into plural bits of the modulation pattern by the modulation rule, may be accumulated. As a result, the influence of the dispersion of information of the bit on the reliability information may be decreased.

The demodulator also calculates the reliability information by Formula (B). According to Formula (B), the likelihood that the j-th bit of the user data is 0 is higher as the reliability information $\lambda_j$ is a greater positive value, and the likelihood that the j-th bit of the user data is 1 is higher as the reliability information $\lambda_j$ is a greater negative value, and a state where the value of the reliability information $\lambda_j$ infinitely diverges does not occur. Therefore, the reliability information $\lambda_j$ may be appropriately calculated by Formula (B). Further, the user data may be appropriately estimated by the reliability information $\lambda_j$. By using the user data appropriately estimated like this, degradation in decoding performance may be prevented in PR decoding such as LDPC decoding, for example. In the case of Formula (B), the reliability information may be easily calculated using only subtraction and multiplication.

In the decoding system, the transmission path decoder may generate N (N is an integer greater than k) generation signals, may respectively calculate N distances between the regenerative signal and each of the N generation signals, may extract k distances out of the calculated N distances in a shorter distance order, and may notify the demodulator of the extracted k distances.

According to this configuration, the transmission path decoder generates N (N is an integer greater than k) generation signals. The transmission path decoder calculates N distances between the regenerative signal and each of the N generation signals respectively. The transmission path decoder extracts k distances out of the calculated N distances in a shorter distance order. The transmission path decoder notifies the extracted k distances to the demodulator. This means that the demodulator calculates the reliability information using the k distances extracted in a shorter distance order. Therefore, the time required for calculating the reliability information may be decreased compared with the case of calculating the reliability information using all of the N distances. Further, the reliability information is calculated using the k distances extracted in a shorter distance order. Therefore, there is an advantage that the calculation accuracy of the reliability information does not significantly degrade compared with the case of calculating the reliability information using all of the N distances.

In the decoding system, the modulator may use the modulation rule, which respectively converts plural pieces of the user data into the modulation patterns different from each other, and the modulation rule may be predetermined so that mutually corresponding bits in the modulation patterns include both 0 and 1 in all of the modulation patterns.

According to this configuration, the modulator uses the modulation rule, which respectively converts plural pieces of the user data into the modulation patterns different from each other. The modulation rule is predetermined so that mutually corresponding bits in the modulation patterns include both 0 and 1 in all of the modulation patterns. Accordingly, there is no case where all the bits are 0 in all of the modulation patterns, hence the likelihood that each bit of the user data is 1 does not become 0%, or the likelihood that each bit of the user data is 0 does not become 100%. Further, there is no case where all the bits are 1 in all of the modulation patterns, hence the likelihood that each bit of the user data is 1 does not become 100%, or the likelihood that each bit of the user data is 0 does not become 0%. As a result, the likelihood that each bit of the user data is 1 and the likelihood that each bit of the user data is 0 may be appropriately calculated respectively.

In the decoding system, the modulator may use the modulation rule, which respectively converts plural pieces of the user data into the modulation patterns different from each other, and the modulation rule may be predetermined so that a distance between the modulation patterns after conversion is shorter as a distance between the plural pieces of the user data is shorter.

According to this configuration, the modulator uses the modulation rule, which respectively converts plural pieces of the user data into the modulation patterns different from each other. The modulation rule is predetermined so that the distance between the modulation patterns after conversion is shorter as the distance between the plural pieces of the user data is shorter. Here in a case where the modulation patterns are similar to each other, that is, in a case where the distance between the modulation patterns is short, decoding errors tend to occur easily in the modulation patterns. However according to the configuration described above, even if a decoding error occurs between modulation patterns of which distance is short, and an error occurs to the user data due to this decoding error, the error in the user data does not become major since the distance between the plural pieces of the user data is short.

In the decoding system, the distance between the plural pieces of the user data may be a Hamming distance calculated in an interval having a predetermined bit length in the plural pieces of the user data, and the predetermined bit length may be determined by the modulation rule.

According to this configuration, the distance between the plural pieces of the user data is a Hamming distance calculated in an interval having a predetermined bit length in the user data. The predetermined bit length is determined by the modulation rule. Therefore, the distance between the plural pieces of the user data may be easily calculated as a Hamming distance.

The decoding system may further include: an error correction encoder which generates the user data by performing error correction encoding on input data, based on a predetermined error correction code rule; and an error correction decoder which performs error correction decoding on each bit of the user data estimated by the demodulator, based on the error correction code rule.

According to this configuration, the error correction encoder generates the user data by performing error correction encoding on input data, based on a predetermined error correction code rule The error correction decoder performs error correction decoding on each bit of the user data estimated by the demodulator, based on the error correction code rule. Therefore, the user data may be decoded appropriately.

In the decoding system, the error correction encoder may use a low density parity check code as the error correction code rule.

According to this configuration, the error correction encoder uses a low density parity check code as the error correction code rule. The demodulator, on the other hand, calculates the likelihood that each bit of the user data is 1, and the likelihood that each bit of the user data is 0 respectively, and calculates the reliability information for each bit based on the difference of the calculated likelihood values. Therefore, the reliability information appropriate for the low density parity check code may be acquired.

In the decoding system, the error correction decoder may perform the error correction decoding by a Sum-Product decoding method based on the low density parity check code.

According to this configuration, the error correction decoder performs the error correction decoding by a Sum-Product decoding method based on the low density parity check code. Here the reliability information appropriate for the low density parity check code may be acquired. Therefore the error correction decoding may be appropriately performed.

The decoding system may further include: a recorder which records the user data after modulation by the modulator on an information recording medium; and an equalization processor which performs predetermined equalization processing on the regenerative signal generated by the regenerator, wherein the regenerator generates the regenerative signal from the user data, recorded on the information recording medium by the recorder and after modulation by the modulator, as a signal transmitted through the transmission path, and the transmission path decoder calculates distances between the generation signals and the regenerative signal on which the equalization processing has been performed by the equalization processor.

According to this configuration, the recorder records the user data after modulation by the modulator on an information recording medium. The equalization processor performs predetermined equalization processing on the regenerative signal generated by the regenerator. The regenerator generates the regenerative signal from the user data, recorded on the information recording medium by the recorder and after modulation by the modulator, as a signal transmitted through the transmission path. The transmission path decoder calculates distances between the generation signals and the regenerative signal on which the equalization processing has been performed by the equalization processor. Therefore, the user data recorded on the information recording medium may be appropriately decoded.

In the decoding system, the transmission path may have characteristics to limit bandwidth of a signal transmitted through the transmission path.

According to this configuration, the transmission path has characteristics to limit the bandwidth of a signal that is transmitted through the transmission path. Therefore, the transmission path has characteristics to disperse an arbitrary element of a signal that is transmitted through the transmission path into plural components of a regenerative signal.

In the decoding system, the transmission path decoder may calculate Euclidean distances as the distances between the regenerative signal and the generation signals.

According to this configuration, the transmission path decoder calculates Euclidean distances as the distances between the regenerative signal and the generation signals. Therefore, the distances between the regenerative signal and the generation signals may be easily calculated.

In the demodulation system, the modulation rule may be determined to limit at least one of a maximum number of times when a same bit continues in the modulation pattern, a minimum number of times when a same bit continues in the modulation pattern, a maximum number of times and a minimum number of times when a same bit continues in the modulation pattern, and a number of times when a specific pattern repeats in the modulation pattern.

According to this configuration, the modulation rule is determined to limit at least one of a maximum number of times when a same bit continues in the modulation pattern, a minimum number of times when a same bit continues in the modulation pattern, a maximum number of times and a minimum number of times when a same bit continues in the modulation pattern, and a number of times when a specific pattern repeats in the modulation pattern. Therefore, the user data may be appropriately modulated.

In the decoding system, the transmission path decoder may calculate the distances between the regenerative signal and the generation signals only in a central interval of the interval, the central interval being obtained by removing a predetermined length from both ends of the interval.

According to this configuration, the transmission path decoder calculates the distances between the regenerative signal and the generation signals only in a central interval of the interval, the central interval being obtained by removing a predetermined length from both ends of the interval. Therefore, the influence of a modulation pattern that comes before or after the modulation pattern in time may be removed. As a result, even more appropriate reliability information may be calculated.

A decoding method according to an aspect of the present invention includes: a modulating step of modulating user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern; a regenerating step of generating a regenerative signal from a signal obtained by transmitting the user data after modulation in the modulating step through the transmission path; a transmission path decoding step of generating signals as generation signals corresponding to the modulation pattern, and calculating distances between the regenerative signal and the generation signals in an interval having a length fixedly or dynamically determined depending on the bit length of the modulation pattern, the signals being generated by taking into account the characteristics of the transmission path with respect to the modulation pattern; and a demodulating step of calculating reliability information for each bit of the user data based on the distances between the regenerative signal and the generation signals in the interval, and estimating each bit of the user data based on the calculated reliability information, wherein the transmission path has characteristics to disperse an arbitrary element of a signal transmitted through the transmission path into plural components of the regenerative signal, the transmission path decoding step generates k (k is a positive integer) generation signals, and respectively calculates k distances between the regenerative signal and each of the k generation signals in the interval, and the demodulating step uses the k distances calculated in the transmission path decoding step to respectively calculate likelihood that each bit of the user data is 1 and likelihood that each bit of the user data is 0 by Formula (A), and calculates the reliability information by Formula (B):

[Mathematical Expression 8]

$$p_j(x) = \sum_{i=0: d_{ij}=x}^{k-1} p(m_i) = \sum_{i=0: d_{ij}=x}^{k-1} \left[ \frac{1}{\sqrt{2\pi\sigma^2}} \exp\left\{ -\frac{m_i^2}{2\sigma^2} \right\} \right] \quad (A)$$

[Mathematical Expression 9]

$$\lambda_j = \{p_j(0) - p_j(1)\} \cdot Q \quad (B)$$

Here, x is 0 or 1, $p_j(x)$ is likelihood that j-th bit of the user data is x, $d_{ij}$ is the j-th bit of the user data corresponding to the modulation pattern of i-th generation signal out of the k generation signals, in; is a distance between the i-th generation signal out of the k generation signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined.

According to this configuration, in the modulating step, the user data is modulated using a modulation rule. The modulation rule converts the user data having a predetermined bit length into a modulation pattern having a bit length that is equivalent to or different from the predetermined bit length in accordance with characteristics of a transmission path so as to disperse information on an arbitrary bit of the user data into plural bits of the modulation pattern. In the regenerating step, a regenerative signal is generated from a signal obtained by transmitting the user data after modulation in the modulating step through the transmission path. In the transmission path decoding step, signals are generated as generation signals corresponding to the modulation pattern, the signals being generated by taking into account the characteristics of the transmission path with respect to the modulation pattern. In the transmission path decoding step, the distances between the regenerative signal and the generation signals are calculated in an interval having a length fixedly or dynamically determined depending on the bit length of the modulation pattern. In the demodulating step, reliability information is calculated for each bit of the user data based on the distances between the regenerative signal and the generation signals in the interval. In the demodulating step, each bit of the user data is estimated based on the calculated reliability information.

The transmission path has characteristics to disperse an arbitrary element of a signal transmitted through the transmission path into plural components of the regenerative signal. In the transmission path decoding step, k generation signals are generated and k distances between the regenerative signal and each of the generation signals in the interval are calculated respectively. Therefore, each element of the signal transmitted through the transmission path, which is dispersed into plural components of the regenerative signal, may be accumulated. In the demodulating step, likelihood of each bit of the user data before modulation is calculated by Formula (A) from the distances between the regenerative signal and the generation signals, using the k distances calculated in the transmission path decoding step. Hence information of each bit of the user data, which is dispersed into plural bits of the modulation pattern by the modulation rule, may be accumulated. As a result, the influence of the dispersion of the information of the bit on the reliability information may be decreased.

In the demodulating step, the reliability information is calculated by Formula (B). According to Formula (B), the likelihood that the j-th bit of the user data is 0 is higher as the reliability information $\lambda_j$ is a greater positive value, and the likelihood that the j-th bit of the user data is 1 is higher as the reliability information $\lambda_j$ is a greater negative value, and a state where the value of the reliability information $\lambda_j$ infinitely diverges does not occur. Therefore, the reliability information $\lambda_j$ may be appropriately calculated by Formula (B). Further, the user data may be appropriately estimated by the reliability information $\lambda_j$. By using the user data appropriately estimated like this, degradation in decoding performance may be prevented in PR decoding such as LDPC decoding, for example. In the case of Formula (B), the reliability information may be easily calculated using only subtraction and multiplication.

A modulation apparatus according to an aspect of the present invention includes: an error correction encoder which generates user data having a predetermined bit length by performing error correction encoding on input data, based on a predetermined error correction code rule; and a modulator which modulates the user data by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern, wherein the modulator uses the modulation rule, which respectively converts plural pieces of the user data into the modulation patterns different from each other, and the modulation rule is predetermined so that a distance between the modulation patterns after conversion is shorter as a distance between the plural pieces of the user data is shorter.

According to this configuration, the error correction encoder generates user data having a predetermined bit length by performing error correction encoding on input data, based on a predetermined error correction code rule. The modulator modulates the user data by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern. The modulator uses the modulation rule, which respectively converts plural pieces of the user data into the modulation patterns different from each other. The modulation rule is predetermined so that a distance between the modulation patterns after conversion is shorter as a distance between the plural pieces of the user data is shorter.

Here, in a case where the modulation patterns are similar to each other, that is, in a case where the distance between the modulation patterns is short, decoding errors tend to occur easily in the modulation patterns. However, according to the configuration described above, even if a decoding error occurs between modulation patterns of which distance is short, and an error occurs to the user data due to this decoding error, the error in the user data does not become major since the distance between the plural pieces of the user data is short.

A decoding apparatus according to an aspect of the present invention is a decoding apparatus which decodes user data having a predetermined bit length modulated by a modulator, the modulator modulating the user data by using a modulation rule which converts the user data in accordance with characteristics of a transmission path into a modulation pattern having a bit length equivalent to or different from the predetermined bit length, so as to disperse information on an arbitrary bit of the user data into plural bits of the modulation pattern, including: a regenerator which generates a regenerative signal from a signal obtained by transmitting the user data after modulation by the modulator through the transmission path; a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and a demodulator which calculates reliability information for each bit of the user data based on the distances between the regenerative signal and the generation signals in the interval, and estimates each bit of the user data based on the calculated reliability information, wherein the transmission path has characteristics to disperse an arbitrary element of a signal transmitted through the transmission path into plural components of the regenerative signal, the transmission path decoder generates k (k is a positive integer) generation signals, and respectively calculates k distances between the regenerative signal and each of the k generation signals in the interval, and the demodulator uses the k distances calculated by the transmission path decoder to respectively calculate likelihood that each bit of the user data is 1 and likelihood that each bit of the user data is 0 by Formula (A), and calculates the reliability information by Formula (B):

[Mathematical Expression 10]

$$p_j(x) = \sum_{i=0:d_{ij}=x}^{k-1} p(m_i) = \sum_{i=0:d_{ij}=x}^{k-1} \left[ \frac{1}{\sqrt{2\pi\sigma^2}} \exp\left\{-\frac{m_i^2}{2\sigma^2}\right\} \right] \quad (A)$$

[Mathematical Expression 11]

$$\lambda_j = \{p_j(0) - p_j(1)\} \cdot Q \quad (B)$$

Here x is 0 or 1, $p_j(x)$ is likelihood that j-th bit of the user data is x, $d_{ij}$ is the j-th bit of the user data corresponding to the modulation pattern of i-th generation signal out of the k generative signals, $m_i$ is a distance between the i-th generation signal out of the k generative signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined.

According to this configuration, the regenerator generates a regenerative signal from a signal obtained by transmitting the user data after modulation by the modulator through the transmission path. The transmission path decoder generates signals by taking into account the characteristics of the transmission path with respect to the modulation pattern, as generation signals corresponding to the modulation pattern. The transmission path decoder calculates the distances between the regenerative signal and the generation signals in an interval having a length fixedly or dynamically determined depending on the bit length of the modulation pattern. The demodulator calculates reliability information for each bit of the user data based on the distances between the regenerative signal and the generation signals in the interval. The demodulator estimates each bit of the user data based on the calculated reliability information.

The transmission path has characteristics to disperse an arbitrary element of a signal transmitted through the transmission path into plural components of the regenerative signal. The transmission path decoder generates k generation signals, and calculates k distances between the regenerative signal and each of the generation signals in the interval respectively. Therefore, each element of the signal transmitted through the transmission path, which is dispersed into plural components of the regenerative signal, may be accumulated. The demodulator calculates likelihood of each bit of the user data before modulation by Formula (A) from the distances between the regenerative signal and the generation signals in the interval, using the k distances calculated by the transmission path decoder. Hence information on each bit of the user data, which is dispersed into plural bits of the modulation pattern by the modulation rule, may be accumulated. As a result, the influence of the dispersion of information of the bit on the reliability information may be decreased.

The demodulator also calculates the reliability information by Formula (B). According to Formula (B), the likelihood that the j-th bit of the user data is 0 is higher as the reliability information $\lambda_j$ is a greater positive value, and the likelihood that the j-th bit of the user data is 1 is higher as the reliability information $\lambda_j$ is a greater negative value, and a state where the value of the reliability information $\lambda_j$ infinitely diverges does not occur. Therefore, the reliability information $\lambda_j$ may be appropriately calculated by Formula (B). Further, the user data may be appropriately estimated by the reliability information $\lambda_j$. By using the user data appropriately estimated like this, degradation in decoding performance may be prevented in PR decoding such as LDPC decoding, for example. In the case of Formula (B), the reliability information may be easily calculated using only subtraction and multiplication.

A decoding apparatus according to an aspect of the present invention is a decoding apparatus in which user data having a predetermined bit length is modulated by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern, a regenerative signal is generated from a signal obtained by transmitting the user data after modulation through the transmission path, and the user data is decoded using the generated regenerative signal, the decoding apparatus includes: a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and a demodulator which calculates reliability information for each bit of the user data based on the distances between the regenerative signal and the generation signals in the interval, and estimates each bit of the user data based on the calculated reliability information, wherein the transmission path has characteristics to disperse an arbitrary element of a signal transmitted through the transmission path into plural components of the regenerative signal, the transmission path decoder generates k (k is a positive integer) generation signals, and respectively calculates k distances between the regenerative signal and each of the k generation signals in the interval, and the demodulator uses the k distances calculated by the transmission path decoder to respectively calculate likelihood that each bit of the user data is 1 and likelihood that each bit of the user data is 0 by Formula (A), and calculates the reliability information by Formula (B):

[Mathematical Expression 12]

$$p_j(x) = \sum_{i=0:d_{ij}=x}^{k-1} p(m_i) = \sum_{i=0:d_{ij}=x}^{k-1} \left[\frac{1}{\sqrt{2\pi\sigma^2}}\exp\left\{-\frac{m_i^2}{2\sigma^2}\right\}\right] \quad (A)$$

[Mathematical Expression 13]

$$\lambda_j = \{p_j(0) - p_j(1)\} \cdot Q \quad (B)$$

Here x is 0 or 1, $p_1(x)$ is likelihood that j-th bit of the user data is x, $d_{ij}$ is the j-th bit of the user data corresponding to the modulation pattern of i-th generation signal out of the k generative signals, $m_i$ is a distance between the i-th generation signal out of the k generative signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined.

According to this configuration, the transmission path decoder generates signals by taking into account the characteristics of the transmission path with respect to the modulation pattern, as generation signals corresponding to the modulation pattern. The transmission path decoder calculates the distances between the regenerative signal and the generation signals in an interval having a length fixedly or dynamically determined depending on the bit length of the modulation pattern. The demodulator calculates reliability information for each bit of the user data based on the distances between the regenerative signal and the generation signals in the interval. The demodulator estimates each bit of the user data based on the calculated reliability information.

The transmission path has characteristics to disperse an arbitrary element of a signal transmitted through the transmission path into plural components of the regenerative signal. The transmission path decoder generates k generation signals, and calculates k distances between the regenerative signal and each of the generation signals in the interval respectively. Therefore, each element of the signal transmitted through the transmission path, which is dispersed into plural components of the regenerative signal, may be accumulated. The demodulator calculates likelihood of each bit of the user data before modulation by Formula (A) from the distances between the regenerative signal and the generation signals in the interval, using the k distances calculated by the transmission path decoder. Hence information on each bit of the user data, which is dispersed into plural bits of the modulation pattern by the modulation rule, may be accumulated. As a result, the influence of the dispersion of information of the bit on the reliability information may be decreased.

The demodulator also calculates the reliability information by Formula (B). According to Formula (B), the likelihood that the j-th bit of the user data is 0 is higher as the reliability information $\lambda_j$ is a greater positive value, and the likelihood that the j-th bit of the user data is 1 is higher as the reliability information $\lambda_j$ is a greater negative value, and a state where the value of the reliability information $\lambda_j$ infinitely diverges does not occur. Therefore, the reliability information $\lambda_j$ may be appropriately calculated by Formula (B). Further, the user data may be appropriately estimated by the reliability information $\lambda_j$. By using the user data appropriately estimated like this, degradation in decoding performance may be prevented in PR decoding such as LDPC decoding, for example. In the case of Formula (B), the reliability information may be easily calculated using only subtraction and multiplication.

A decoding system according to an aspect of the present invention includes: a modulator which modulates user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern; a regenerator which generates a regenerative signal from a signal obtained by transmitting the user data after modulation by the modulator through the transmission path; a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and a demodulator which calculates reliability information for each bit of the user data based on the distances between the regenerative signal and the generation signals in the interval, and estimates each bit of the user data based on the calculated reliability information, wherein the transmission path has characteristics to disperse an arbitrary element of a signal transmitted through the transmission path into plural components of the regenerative signal, the modulator uses the modulation rule, which respectively converts plural pieces of the user data into the modulation patterns different from each other, the modulation rule is predetermined so that a distance between the modulation patterns after conversion is shorter as a distance between the plural pieces of the user data is shorter, and the demodulator accumulates information on each bit of the user data dispersed into plural bits of the modulation pattern by the modulation rule, based on the distances between the regenerative signal and the generation signals in the interval, calculates likelihood that each bit of the user data is 1 and likelihood that each bit of the user data is 0 respectively, and calculates the reliability information for each bit based on each calculated likelihood.

According to this configuration, the modulator modulates the user data using a modulation rule. The modulation rule converts the user data having a predetermined bit length into a modulation pattern having a bit length equivalent to or different from the predetermined bit length in accordance with characteristics of a transmission path, so as to disperse information on an arbitrary bit of the user data into plural bits of the modulation pattern. The regenerator generates a regenerative signal from a signal obtained by transmitting the user data after modulation by the modulator through the transmission path. The transmission path decoder generates signals by taking into account the characteristics of the transmission path with respect to the modulation pattern, as generation signals corresponding to the modulation pattern. The transmission path decoder calculates the distances between the regenerative signal and the generation signals in an interval having a length fixedly or dynamically determined depending on the bit length of the modulation pattern. The demodulator calculates reliability information for each bit of the user data based on the distances between the regenerative signal and the generation signals in the interval. The demodulator estimates each bit of the user data based on the calculated reliability information.

The transmission path has characteristics to disperse an arbitrary element of a signal transmitted through the transmission path into plural components of the regenerative signal. The modulator uses the modulation rule, which respectively converts plural pieces of the user data into the modulation patterns different from each other. The modulation rule is predetermined so that the distance between the modulation patterns after conversion is shorter as the distance between the plural pieces of the user data is shorter. Here in a case where the modulation patterns are similar to each other, that is, in a case where the distance between the modulation patterns is short, decoding errors tend to occur easily in the modulation patterns. However according to the configuration described above, even if a decoding error occurs between modulation patterns of which distance is short, and an error occurs to the user data due to this decoding error, the error in the user data does not become major since the distance between the plural pieces of the user data is short.

The demodulator accumulates information on each bit of the user data dispersed into plural bits of the modulation pattern by the modulation rule, based on the distances between the regenerative signal and the generation signals in the interval, and calculates likelihood that each bit of the user data is 1 and likelihood that each bit of the user data is 0 respectively. The demodulator calculates the reliability information for each bit based on each calculated likelihood. In this way, the demodulator accumulates information on each bit of the user data dispersed into plural bits of the modulation pattern by the modulation rule. As a result, the influence of the dispersion of information of the bit on the reliability information may be decreased. The user data may be appropriately estimated by this reliability information. By using the user data appropriately estimated like this, degradation in decoding performance may be prevented in PR decoding such as LDPC decoding, for example.

INDUSTRIAL APPLICABILITY

The decoding system and the decoding method according to the present invention may decrease the influence of dispersion of information of a bit on the reliability information, and is useful for a decoding system and a decoding method for decoding a signal acquired from a transmission path.

The invention claimed is:

1. A decoding system, comprising:
a modulator which modulates user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern;
a regenerator which generates a regenerative signal from a signal obtained by transmitting the user data after modulation by the modulator through the transmission path;
a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and
a demodulator which calculates reliability information for each bit of the user data based on the distances between the regenerative signal and the generation signals in the interval, and estimates each bit of the user data based on the calculated reliability information, wherein
the transmission path has characteristics to disperse an arbitrary element of a signal transmitted through the transmission path into plural components of the regenerative signal,
the transmission path decoder generates k (k is a positive integer) generation signals, and respectively calculates k distances between the regenerative signal and each of the k generation signals in the interval, and
the demodulator uses the k distances calculated by the transmission path decoder to respectively calculate likelihood that each bit of the user data is 1 and likelihood that each bit of the user data is 0 by Formula (A), and calculates the reliability information by Formula (B):

wherein Formula (A) is:

$$p_j(x) = \sum_{i=0:d_{ij}=x}^{k-1} p(m_i) = \sum_{i=0:d_{ij}=x}^{k-1} \left[ \frac{1}{\sqrt{2\pi\sigma^2}} \exp\left\{-\frac{m_i^2}{2\sigma^2}\right\} \right] \quad (A)$$

wherein Formula (B) is:

$$\lambda_j = \{p_j(0) - p_j(1)\} \cdot Q \quad (B)$$

where x is 0 or 1, $p_j(x)$ is likelihood that j-th bit of the user data is x, $d_{ij}$ is the j-th bit of the user data corresponding to the modulation pattern of i-th generation signal out of the k generation signals, $m_i$ is a distance between the i-th generation signal out of the k generation signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined;

wherein a middle part of Formula (A) is:

$$\sum_{i=0:d_{ij}=x}^{k-1} p(m_i); \text{ and}$$

wherein the middle part of Formula (A) expresses a sum of the probabilities of the modulation patterns where $d_{ij}$ is x, out of k probabilities calculated from k modulation patterns.

2. The decoding system according to claim 1, wherein the transmission path decoder generates N (N is an integer greater than k) generation signals, respectively calculates N distances between the regenerative signal and each of the N generation signals, extracts k distances out of the calculated N distances in a shorter distance order, and notifies the demodulator of the extracted k distances.

3. The decoding system according to claim 1, wherein the modulator uses the modulation rule, which respectively converts plural pieces of the user data into the modulation patterns different from each other, and the modulation rule is predetermined so that mutually corresponding bits in the modulation patterns include both 0 and 1 in all of the modulation patterns.

4. The decoding system according to claim 1, wherein the modulator uses the modulation rule, which respectively converts plural pieces of the user data into the modulation patterns different from each other, and the modulation rule is predetermined so that a distance between the modulation patterns after conversion is shorter as a distance between the plural pieces of the user data is shorter.

5. The decoding system according to claim 4, wherein the distance between the plural pieces of the user data is a Hamming distance calculated in an interval having a predetermined bit length in the plural pieces of the user data, and the predetermined bit length is determined by the modulation rule.

6. The decoding system according to claim 1, further comprising:
an error correction encoder which generates the user data by error-correction encoding input data, based on a predetermined error correction code rule; and
an error correction decoder which error-correction decodes each bit of the user data estimated by the demodulator based on the error correction code rule.

7. The decoding system according to claim 6, wherein the error correction encoder uses a low density parity check code as the error correction code rule.

8. The decoding system according to claim 7, wherein the error correction decoder performs error-correction decoding by the Sum-Product decoding method based on the low density parity check code.

9. The decoding system according to claim 6, further comprising:
a recorder which records the user data after modulation by the modulator on an information recording medium; and
an equalization processor which processes the regenerative signal generated by the regenerator in predetermined equalization processing, wherein
the regenerator generates the regenerative signal from the user data, recorded on the information recording medium by the recorder and after modulation by the modulator, as a signal transmitted through the transmission path, and
the transmission path decoder calculates distances between the generation signals and the regenerative signal processed by the equalization processor in equalization processing.

10. The decoding system according to claim 1, wherein the transmission path has characteristics to limit bandwidth of a signal transmitted through the transmission path.

11. The decoding system according to claim 1, wherein the transmission path decoder calculates Euclidean distances as the distances between the regenerative signal and the generation signals.

12. A decoding system, comprising:
a modulator which modulates user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern;
a regenerator which generates a regenerative signal from a signal obtained by transmitting the user data after modulation by the modulator through the transmission path;
a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and
a demodulator which calculates reliability information for each bit of the user data based on the distances between the regenerative signal and the generation signals in the interval, and estimates each bit of the user data based on the calculated reliability information, wherein
the modulation rule is determined to limit at least one of a maximum number of times when a same bit continues in the modulation pattern, a minimum number of times when a same bit continues in the modulation pattern, a maximum number of times and a minimum number of times when a same bit continues in the modulation pattern, and a number of times when a specific pattern repeats in the modulation pattern,
the transmission path has characteristics to disperse an arbitrary element of a signal transmitted through the transmission path into plural components of the regenerative signal,
the transmission path decoder generates k (k is a positive integer) generation signals, and respectively calculates k distances between the regenerative signal and each of the k generation signals in the interval, and
the demodulator uses the k distances calculated by the transmission path decoder to respectively calculate likelihood that each bit of the user data is 1 and likelihood that each bit of the user data is 0 by Formula (A), and calculates the reliability information by Formula (B):
wherein Formula (A) is:

$$p_j(x) = \sum_{i=0:d_{ij}=x}^{k-1} p(m_i) = \sum_{i=0:d_{ij}=x}^{k-1} \left[ \frac{1}{\sqrt{2\pi\sigma^2}} \exp\left\{-\frac{m_i^2}{2\sigma^2}\right\} \right] \quad (A)$$

wherein Formula (B) is:
$$\lambda_j = \{p_j(0) - p_j(1)\} \cdot Q \quad (B)$$

where x is 0 or 1, $p_j(x)$ is likelihood that j-th bit of the user data is x, $d_{ij}$ is the j-th bit of the user data corresponding to the modulation pattern of i-th generation signal out of the k generation signals, $m_i$ is a distance between the i-th generation signal out of the k generation signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined;
wherein a middle part of Formula (A) is:

$$\sum_{i=0:d_{ij}=x}^{k-1} p(m_i); \text{ and}$$

wherein the middle part of Formula (A) expresses a sum of the probabilities of the modulation patterns where $d_{ij}$ is x, out of k probabilities calculated from k modulation patterns.

13. A decoding system, comprising:
a modulator which modulates user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern;
a regenerator which generates a regenerative signal from a signal obtained by transmitting the user data after modulation by the modulator through the transmission path;
a transmission path decoder which generates signals as generation signals corresponding to the modulation pattern, and calculates distances between the regenerative signal and the generation signals in an interval having a length fixedly or dynamically determined depending on the bit length of the modulation pattern, the signals being generated by taking into account the characteristics of the transmission path with respect to the modulation pattern; and
a demodulator which calculates reliability information for each bit of the user data based on the distances between the regenerative signal and the generation signals in the interval, and estimates each bit of the user data based on the calculated reliability information, wherein
the transmission path has characteristics to disperse an arbitrary element of a signal transmitted through the transmission path into plural components of the regenerative signal,
the transmission path decoder generates k (k is a positive integer) generation signals, and respectively calculates k distances between the regenerative signal and each of the k generation signals in the interval,
the transmission path decoder calculates the distances between the regenerative signal and the generation signals only in a central interval of the interval, the central interval being obtained by removing a predetermined length from both ends of the interval, and
the demodulator uses the k distances calculated by the transmission path decoder to respectively calculate likelihood that each bit of the user data is 1 and likelihood that each bit of the user data is 0 by Formula (A), and calculates the reliability information by Formula (B):
wherein Formula (A) is:

$$p_j(x) = \sum_{i=0:d_{ij}=x}^{k-1} p(m_i) = \sum_{i=0:d_{ij}=x}^{k-1} \left[ \frac{1}{\sqrt{2\pi\sigma^2}} \exp\left\{ -\frac{m_i^2}{2\sigma^2} \right\} \right] \quad (A)$$

wherein Formula (B) is:

$$\lambda_j = \{p_j(0) - p_j(1)\} \cdot Q \quad (B)$$

where x is 0 or 1, $p_j(x)$ is likelihood that j-th bit of the user data is x, $d_{ij}$ is the j-th bit of the user data corresponding to the modulation pattern of i-th generation signal out of the k generation signals, $m_i$ is a distance between the i-th generation signal out of the k generation signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined;
wherein a middle part of Formula (A) is:

$$\sum_{i=0:d_{ij}=x}^{k-1} p(m_i); \text{ and}$$

wherein the middle part of Formula (A) expresses a sum of the probabilities of the modulation patterns where $d_{ij}$ is x, out of k probabilities calculated from k modulation patterns.

14. A decoding method, comprising:
a modulating step of modulating user data having a predetermined bit length by using a modulation rule which converts the user data in accordance with characteristics of a transmission path into a modulation pattern having a bit length equivalent to or different from the predetermined bit length so as to disperse information on an arbitrary bit of the user data into plural bits of the modulation pattern;
a regenerating step of generating a regenerative signal from a signal obtained by transmitting the user data after modulation in the modulating step through the transmission path;
a transmission path decoding step of generating signals as generation signals corresponding to the modulation pattern, and calculating distances between the regenerative signal and the generation signals in an interval having a length fixedly or dynamically determined depending on the bit length of the modulation pattern, the signals being generated by taking into account the characteristics of the transmission path with respect to the modulation pattern; and
a demodulating step of calculating reliability information for each bit of the user data based on the distances between the regenerative signal and the generation signals in the interval, and estimating each bit of the user data based on the calculated reliability information, wherein
the transmission path has characteristics to disperse an arbitrary element of a signal transmitted through the transmission path into plural components of the regenerative signal,
the transmission path decoding step generates k (k is a positive integer) generation signals, and respectively calculates k distances between the regenerative signal and each of the k generation signals in the interval, and
the demodulating step uses the k distances calculated in the transmission path decoding step to respectively calculate likelihood that each bit of the user data is 1 and likelihood that each bit of the user data is 0 by Formula (A), and calculates the reliability information by Formula (B):

wherein Formula (A) is:

$$p_j(x) = \sum_{i=0:d_{ij}=x}^{k-1} p(m_i) = \sum_{i=0:d_{ij}=x}^{k-1} \left[ \frac{1}{\sqrt{2\pi\sigma^2}} \exp\left\{-\frac{m_i^2}{2\sigma^2}\right\} \right] \quad (A)$$

wherein Formula (B) is:

$$\lambda_j = \{p_j(0) - p_j(1)\} \cdot Q \quad (B)$$

where x is 0 or 1, $p_j(x)$ is likelihood that j-th bit of the user data is x, $d_{ij}$ is the j-th bit of the user data corresponding to the modulation pattern of i-th generation signal out of the k generation signals, $m_i$ is a distance between the i-th generation signal out of the k generation signals and the regenerative signal, i is an integer in 0 to (k−1) range, $\lambda_j$ is the reliability information of the j-th bit of the user data, j is an integer in 1 to M range, M is a bit length of the user data, and the coefficient Q is a real number that is fixedly or dynamically determined;

wherein a middle part of Formula (A) is:

$$\sum_{i=0:d_{ij}=x}^{k-1} p(m_i); \text{ and}$$

wherein the middle part of Formula (A) expresses a sum of the probabilities of the modulation patterns where $d_{ij}$ is x, out of k probabilities calculated from k modulation patterns.

\* \* \* \* \*